(12) United States Patent
Kovintavewat et al.

(10) Patent No.: US 7,602,863 B2
(45) Date of Patent: Oct. 13, 2009

(54) METHOD AND APPARATUS FOR PROVIDING ITERATIVE TIMING RECOVERY

(75) Inventors: Piya Kovintavewat, Atlanta, GA (US); John Robert Barry, Atlanta, GA (US); Mehmet Fatih Erden, Pittsburgh, PA (US); Erozan Mehmet Kurtas, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 657 days.

(21) Appl. No.: 10/950,312

(22) Filed: Sep. 24, 2004

(65) Prior Publication Data

US 2006/0067434 A1   Mar. 30, 2006

(51) Int. Cl.
*H04L 27/06* (2006.01)
(52) U.S. Cl. .................. 375/340; 375/316; 375/324; 375/341; 375/343; 375/262; 375/365
(58) Field of Classification Search .................. 375/340
See application file for complete search history.

(56) References Cited

U.S. PATENT DOCUMENTS

| | | | | |
|---|---|---|---|---|
| 6,064,703 | A * | 5/2000 | Cusani et al. ................ | 375/349 |
| 6,249,544 | B1 * | 6/2001 | Azazzi et al. ................ | 375/233 |
| 6,356,555 | B1 | 3/2002 | Rakib et al. .................. | 370/441 |
| 6,625,236 | B1 * | 9/2003 | Dent et al. ................... | 375/341 |
| 6,694,477 | B1 | 2/2004 | Lee ............................. | 714/784 |
| 6,775,084 | B1 * | 8/2004 | Ozdemir et al. .............. | 360/55 |
| 6,959,038 | B2 * | 10/2005 | Agazzi et al. ................ | 375/233 |
| 7,010,064 | B2 * | 3/2006 | Penther ....................... | 375/340 |
| 7,050,517 | B1 * | 5/2006 | Sallaway et al. ............. | 375/350 |
| 7,092,457 | B1 * | 8/2006 | Chugg et al. ................. | 375/324 |
| 7,113,555 | B2 * | 9/2006 | Campello de Souza et al. .. | 375/341 |
| 7,185,260 | B2 * | 2/2007 | Coombs et al. .............. | 714/755 |
| 7,248,849 | B1 * | 7/2007 | Ariyavisitakul et al. ...... | 455/307 |
| 2002/0168017 | A1 * | 11/2002 | Berthet et al. ................ | 375/267 |
| 2004/0071234 | A1 * | 4/2004 | Li ................................ | 375/341 |
| 2005/0066261 | A1 * | 3/2005 | Morita et al. ................ | 714/800 |

(Continued)

OTHER PUBLICATIONS

Raheli, R. Polydoros, A. Ching-Kae Tzou, Per-Survivor Processing: a general approach to MLSE in uncertain environments, Communications, IEEE Transactions on, Publication Date: Feb./Mar./Apr. 1995, vol. 43, Issue: 234, On pp. 354-364.*

(Continued)

*Primary Examiner*—Shuwang Liu
*Assistant Examiner*—Kenneth Lam
(74) *Attorney, Agent, or Firm*—Westman, Champlin & Kelly P.A.

(57) ABSTRACT

A method includes the steps of receiving a signal indicative of data bits, and performing per survivor processing-iterative timing recovery (PSP-ITR) on the received signal to generate probabilities of the data bits. To perform PSP-ITR on the received signal, the signal can be processed using a per survivor processing-soft decision algorithm (PSP-SDA) which jointly performs timing recovery and equalization in accordance with embodiments of the present invention. The soft decision algorithm (SDA) can be, for example, a Bahl, Cocke, Jelinek, and Raviv (BCJR) algorithm or a Soft Output Viterbi Algorithm (SOVA) modified in accordance with the concepts of the present invention such that it is configured to implement per survivor processing (PSP) to jointly perform timing recovery and equalization.

16 Claims, 16 Drawing Sheets

U.S. PATENT DOCUMENTS

| | | | |
|---|---|---|---|
| 2005/0169415 A1* | 8/2005 | Nayak et al. | 375/355 |
| 2006/0072426 A1* | 4/2006 | Lin et al. | 369/124.01 |
| 2007/0076826 A1* | 4/2007 | Stockmanns et al. | 375/341 |

OTHER PUBLICATIONS

Zeng, H.H. Ye Li Winters, J.H., Improved spatial-temporal equalization for EDGE: a fastselective-direction MMSE timing recovery algorithm and two-stagesoft-output equalizer, Communications, IEEE Transactions on Publication Date: Dec 2001, vol. 49, Issue: 12, On page(s): 2124-2134.*

Kovintavewat, P. Barry, J.R. Erden, M.F. Kurtas, E., Per-survivor timing recovery for uncoded partial response channels, Communications, 2004 IEEE International Conference on, Publication Date: Jun. 20-24, 2004, vol. 5, on pp. 2715-2719 vol. 5.*

Nayak et al., A., "Joint Timing Recovery and Turbo Equalization for Coded Partial Response Channels", IEEE Transactions on Magnetics, vol. 38, No. 5, Sep. 2002.

Nayak et al., A., "Iterative Timing Recovery and Turbo Equalization", $3^{rd}$ International Symposium on Turbo Codes, Sep. 2003.

Barry et al., J., "Iterative Timing Recovery", IEEE Signal Processing Magazine, pp. 89-102, Jan. 2004.

Kovintavewat et al., P., "A New Timing Recovery Architecture for Fast Convergence" IEEE International Symposium on Circuits and Systems, vol. 2, pp. 13-16, May 2003.

* cited by examiner

| Timing recovery schemes | $\sigma_w/T = 0.5\%$ | $\sigma_w/T = 1\%$ |
|---|---|---|
| Conventional receiver & NonPSP-ITR | 0.028 | 0.055 |
| PSP-ITR | 0.015 | 0.032 |
| Trained PLL | 0.019 | 0.037 |

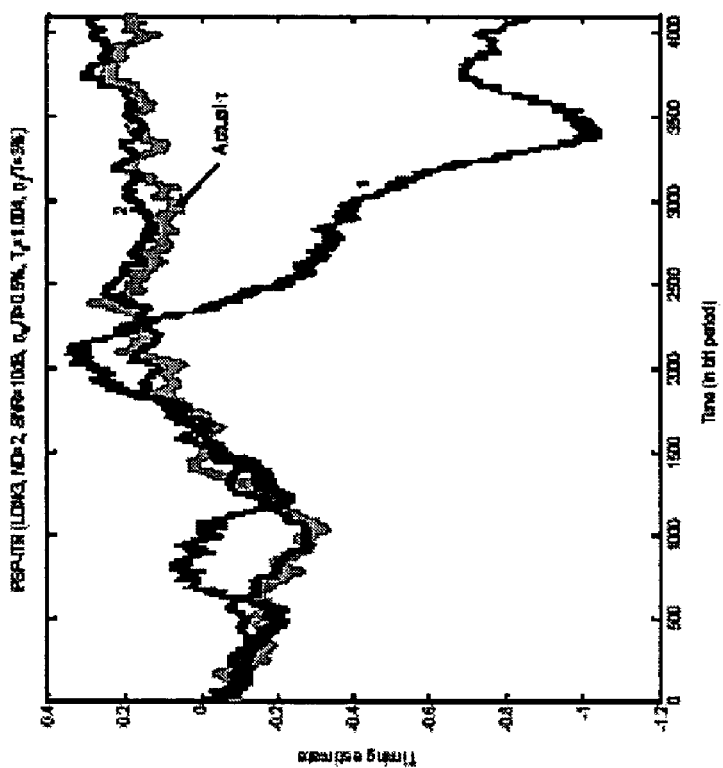
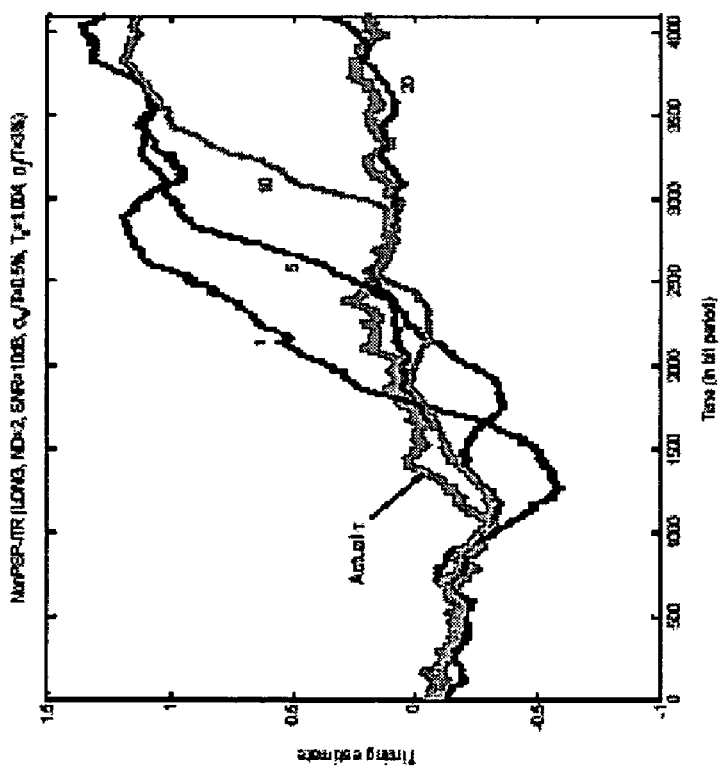
FIG. 14

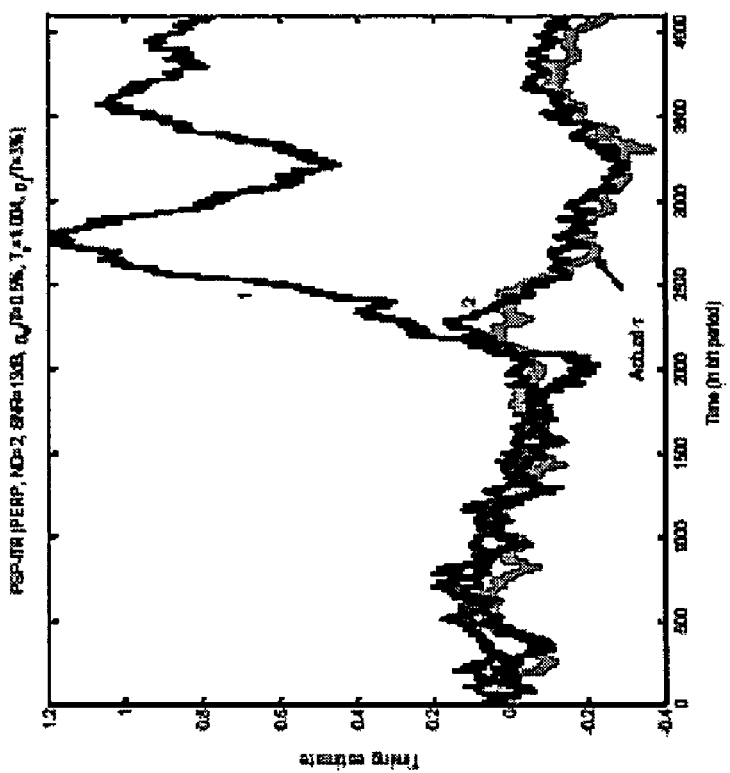
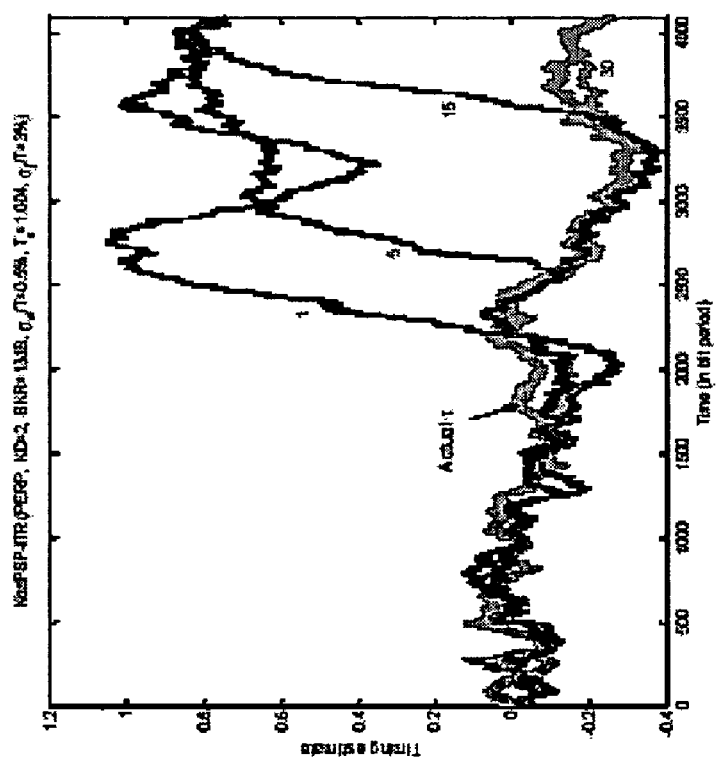
FIG. 15

METHOD AND APPARATUS FOR PROVIDING ITERATIVE TIMING RECOVERY

FIELD OF THE INVENTION

The present invention relates generally to timing recovery. More particularly, but not by limitation, the present invention relates to timing recovery using iterative coding schemes.

BACKGROUND OF THE INVENTION

The process of synchronizing a sampler with a received analog signal is known as timing recovery. It is a crucial component in a recording system channel detector, such as magnetic recording channel detectors. The quality of synchronization has a tremendous impact on the overall performance of the channel detector. At current areal recording densities, existing timing recovery architectures perform well. However, at the higher areal densities which will be used in the future, signal energy will be lower and noise in the system will increase. Thus, the signal-to-noise ratio (SNR) will decrease.

The advent of iterative error-correction codes allows the system to operate at low SNRs with acceptable performance due to their large coding gains. This means that timing recovery must also function at low SNRs. A conventional receiver performs timing recovery and error-correction decoding separately. Specifically, conventional timing recovery ignores the presence of error-correction codes; therefore, it fails to function properly at low SNRs, and timing errors increase.

Theoretically, joint maximum-likelihood (ML) estimation of timing offsets and message bits, which will jointly perform timing recovery, equalization and decoding, is a preferred method of synchronization; however, its complexity is gigantic. Fortunately, the solution to this problem with complexity comparable to a conventional receiver has been proposed, which is realized by embedding the timing recovery step inside the turbo equalizer so as to perform their tasks jointly. From this point on, that iterative timing recovery (ITR) scheme is denoted as "NonPSP-ITR", where "PSP" stands for per survivor processing. However, NonPSP-ITR requires a large number of turbo iterations to provide an acceptable performance when the channel experiences severe timing jitter noise.

Embodiments of the present invention provide solutions to these and other problems, and offer other advantages over the prior art.

SUMMARY OF THE INVENTION

A method of the present invention includes the steps of receiving a signal indicative of data bits, and performing per survivor processing-iterative timing recovery (PSP-ITR) on the received signal to generate probabilities of the data bits. To perform PSP-ITR on the received signal, the signal can be processed using a per survivor processing-soft decision algorithm (PSP-SDA) which jointly performs timing recovery and equalization in accordance with embodiments of the present invention. The soft decision algorithm (SDA) can be, for example, a Bahl, Cocke, Jelinek, and Raviv (BCJR) algorithm modified in accordance with the concepts of the present invention such that it is configured to implement per survivor processing (PSP) to jointly perform timing recovery and equalization. In other embodiments, the SDA is a Soft Output Viterbi Algorithm (SOVA) configured to implement PSP to jointly perform timing recovery and equalization. Still other SDAs can be used with PSP to jointly perform timing recovery and equalization in other embodiments of the present invention.

In some embodiments of the invention, the step of processing the received signal using a PSP-SDA algorithm includes the step of calculating a plurality of branch metrics, with each branch metric corresponding to a transition branch between states in a trellis. A survivor path between the states is then identified as a function of the calculated branch metrics.

In some embodiments, each state has an associated sampling phase offset used to sample the received signal. The sampling phase offsets differ between various states. In these embodiments, the step of calculating the plurality of branch metrics further includes calculating each branch metric as a function of the sampling phase offset at a starting state of the corresponding branch. The branch metrics can be calculated during both forward and backward recursions.

Other features and benefits that characterize embodiments of the present invention will be apparent upon reading the following detailed description and review of the associated drawings.

BRIEF DESCRIPTION OF THE DRAWINGS

FIG. 2-1 is a block diagram illustrating a data encoding with a conventional PR-IV channel model circuit.

FIG. 2-2 is a block diagram illustrating a conventional receiver architecture.

FIG. 2-3 is a block diagram illustrating a prior art receiver architecture which implements NonPSP-ITR.

FIG. 2-4 is a block diagram illustrating the iterative nature of timing recovery, equalization and decoding using the Non-PSP-ITR.

FIG. 3 is a block diagram illustrating a PSP-based iterative timing recovery architecture or circuit.

FIG. 4 is a trellis structure demonstrating how PSP-BCJR performs during forward recursion.

FIG. 5-1 is a table illustrating PLL gain parameters for different system conditions.

FIGS. 10-1 and 10-2 are plots illustrating cycle slip correction for two different sample packets at SNR=5 dB and $\sigma_w/T=1\%$.

FIG. 14 illustrates plots of cycle slip correction for a longitudinal recording channel.

FIG. 15 illustrates plots of cycle slip correction for a perpendicular recording channel.

DETAILED DESCRIPTION OF ILLUSTRATIVE EMBODIMENTS

Figure 1:
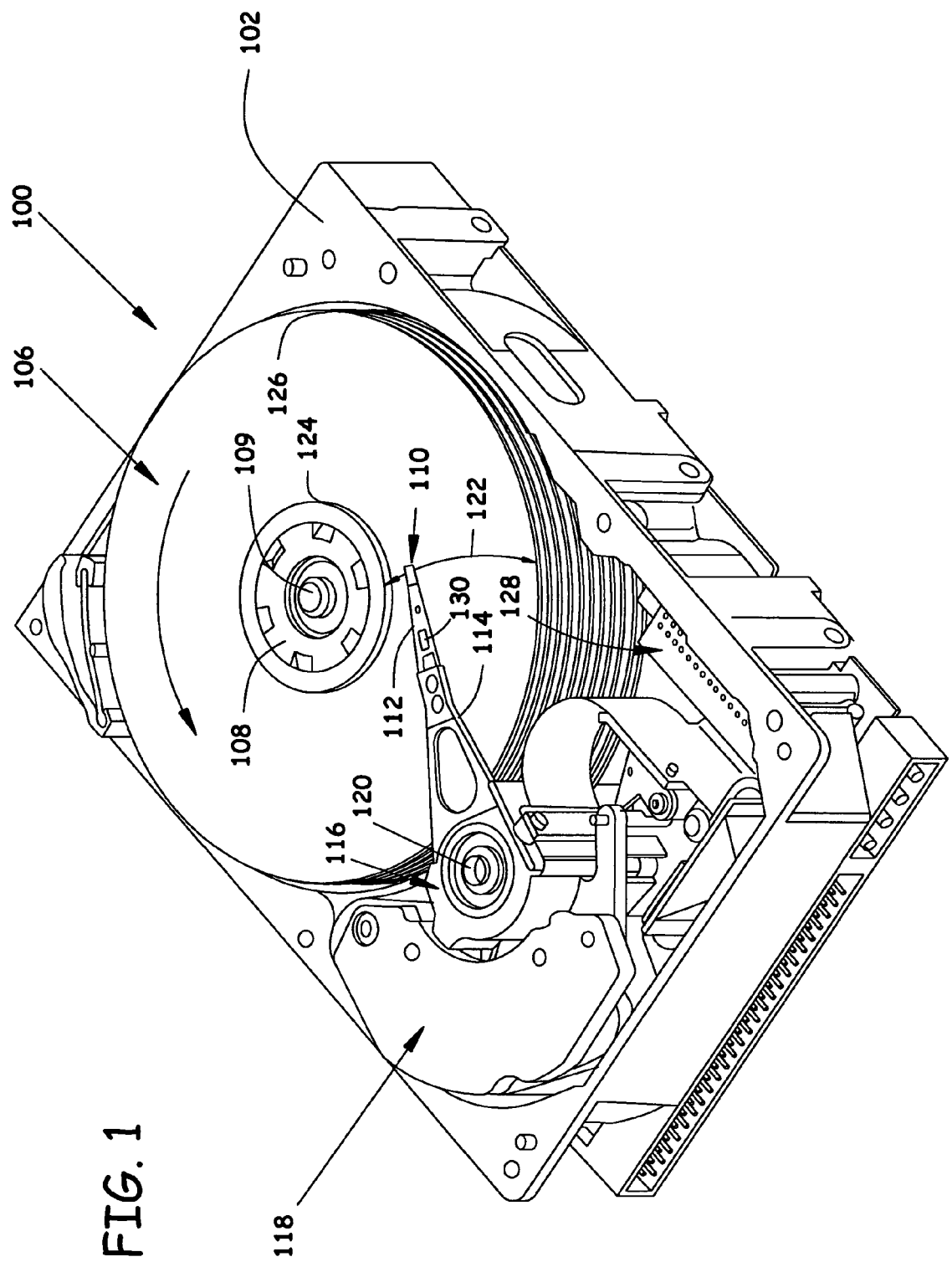
FIG. 1 is an isometric view of a disc drive configured to implement the present invention.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). The present invention is useful in providing timing recovery in a channel, such as a recording channel, which is represented diagrammatically in FIG. 1 at reference number 128. The recording channel can be of the type used with data storage systems such as disc drive 100, but is not limited to use with any particular type of data storage system. Disc drive 100 is intended to represent any type of data storage system, or other types of systems such as communication systems, in which the present invention is embodied and used.

As noted previously, when used in a recording or other channel, NonPSP-ITR requires a large number of turbo iterations to provide an acceptable performance when the channel experiences severe timing jitter noise. This problem can be solved by utilizing a PSP technique. Per survivor processing, or PSP, is a technique for jointly estimating a data sequence and unknown parameters, such as channel coefficients, carrier phase, and so forth. PSP has been employed in many applications including channel identification, adaptive maximum likelihood (ML) sequence detectors, and phase/carrier recovery. PSP can be applied to the development of PSP-based timing recovery implemented based on a Viterbi algorithm, which performs timing recovery and data detection jointly. Results have shown that it performs better than the conventional receiver that separates these two tasks, especially when the timing jitter is severe.

Similarly, timing recovery and equalization can be performed jointly by using a PSP technique, which can yield better performance than performing them separately. To do so, a PSP-soft decision algorithm (SDA) is provided in which the timing recovery is embedded inside the soft decision equalizer, and is used to provide a PSP-based iterative timing recovery scheme, which is referred to herein as "PSP-ITR". PSP-ITR iteratively exchanges soft information between the PSP-SDA and an error-correction decoder. The SDA can be a Bahl, Cocke, Jelinek, and Raviv (BCJR) algorithm resulting in the PSP-SDA being a PSP-BCJR, a Soft Output Viterbi Algorithm (SOVA) resulting in the PSP-SDA being a PSP-SOVA, or other types of soft decision algorithms.

The following discussion provides a description of a new timing recovery architecture, in accordance with the present invention, which is more robust to cycle slips in the system. Without loss of generality or limitation of scope, the PR-IV channel model (a partial response channel with three target values) is used to illustrate the steps in the new algorithm. However, it is worth noting that the algorithm can be applied not only to any target response (other than PR-IV), but also to equalized channels as well. Before going into the details of the timing recovery algorithm of the present invention, the channel architecture is first introduced, and a brief explanation of a conventional approach is provided.

Channel Model

Figures 1, 2:
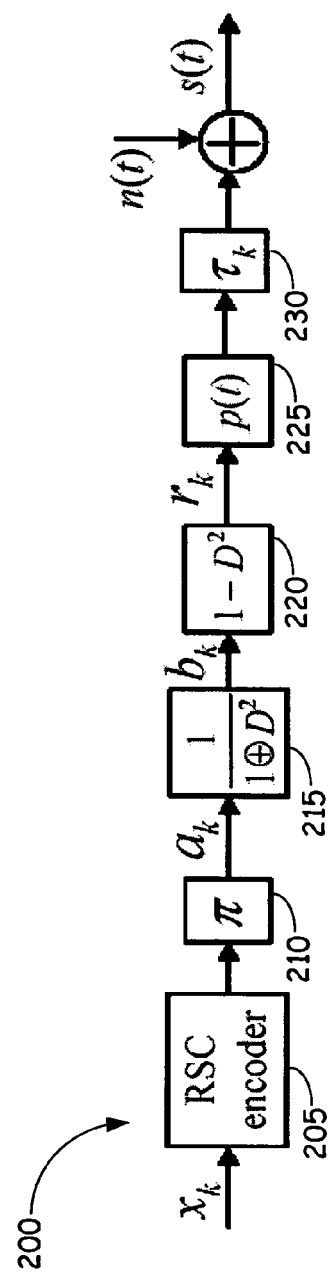
Figure 2:
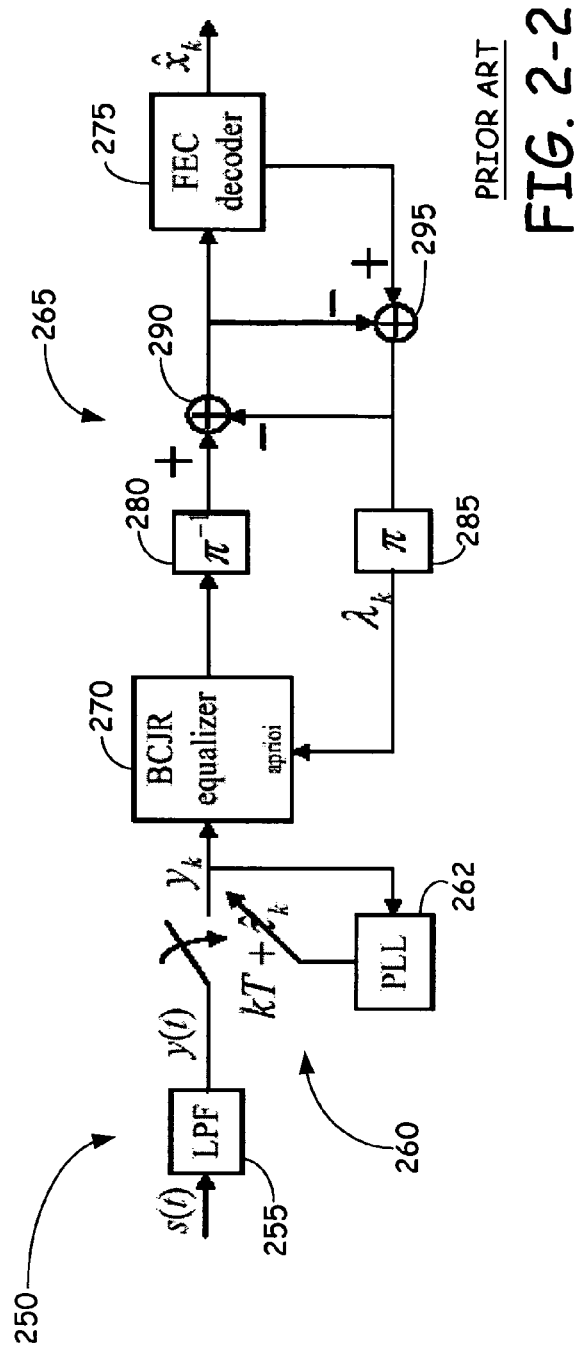

Consider the coded partial response (PR) channel model 200 shown in FIG. 2-1. The message bits $\{x_k\}$ are encoded by a recursive systematic convolutional (RSC) encoder 205 and then interleaved by an s-random interleaver 210 to form an interleaved sequence $\alpha_k$. The interleaved sequence $\alpha_k$ with bit period T is further precoded by a $1/(1 \oplus D^2)$ precoder 215 (to form a precoded set of bits $b_k$) and modulated using modulation circuitry 220 and 225 by a PR-IV pulse $h(t)=p(t)-p(t-2T)$, where $p(t)=\sin(\pi t/T)/(\pi t/T)$ is an ideal zero excess-bandwidth Nyquist pulse.

The readback signal, s(t), can therefore be written as $$s(t) = \sum_k b_k h(t - kT - \tau_k) + n(t) \qquad \text{Equation 1}$$

where $\tau_k$ is the k-th timing offset, defined as the difference between the actual and the expected arrival time of the k-th pulse, and n(t) is additive white Gaussian noise (AWGN) with two-sided power spectral density $N_0/2$. Timing offset circuit 230 models $\tau_k$ as a random walk model according to Equation 2, $$\tau_{k+1} = \tau_k + \sigma_w \omega_k \qquad \text{Equation 2}$$

where $\sigma_w$ determines the severity of the timing jitter and $\omega_k$ is an independent identically distributed (i.i.d.) zero-mean unit-variance Gaussian random variable. The random walk model is chosen because of its simplicity to represent a variety of channels by changing only one parameter. Perfect acquisition, i.e., $\tau_0=0$, is also assumed.

Conventional Receiver

At the front-end receiver 250 of FIG. 2-2, an ideal low-pass filter 255, whose impulse response is p(t)/T, is employed to eliminate out-of-band noise. The received analog signal, y(t), is then sampled using a sampling circuit 260 at time $kT+\hat{\tau}_k$, where $\hat{\tau}_k$ is the receiver's estimate of $\tau_k$ (or the k-th sampling phase offset), creating $$y_k = y(kT + \hat{\tau}_k) = \sum_i b_i h(kT + \hat{\tau}_k - iT - \tau_i) + n'_k \qquad \text{Equation 3}$$

where $n'_k$ is zero-mean Gaussian random variable with variance $\sigma_n^2 = N_0/(2T)$.

A conventional timing recovery practically takes the form of a phase-locked-loop (PLL) 262 where, with perfect acquisition and no frequency offset component in the system, the sampling phase offset is updated by a first-order PLL, i.e., $$\hat{\tau}_{k+1} = \hat{\tau}_k + \xi \hat{\epsilon}_k \qquad \text{Equation 4}$$

where $\xi$ is a PLL gain parameter determining the loop bandwidth and the convergence rate, and $\hat{\epsilon}_k$ is an estimate of the timing error $\epsilon_k = \tau_k - \hat{\tau}_k$. This estimate is generated by a well-known Mueller and Müller (M&M) timing error detector (TED) according to:

$$\hat{\epsilon}_k = \frac{3T}{16} \{y_k \tilde{r}_{k-1} - y_{k-1} \tilde{r}_k\} \qquad \text{Equation 5}$$

where the constant $3T/16$ ensures the S-curve slope of Equation 5 is one at the origin, and $\tilde{r} = E[r_k|y_k]$ is the k-th soft estimate of the channel output $r_k \in \{0, \pm 2\}$, which is given by:

$$\tilde{r}_k = \frac{2\sinh(sy_k/\sigma_n^2)}{\cosh(2y_k/\sigma_n^2) + e^{2/\sigma_n^2}} \qquad \text{Equation 6}$$

The soft estimate is considered in this disclosure because it provides better performance than the hard estimate, which is obtained by a memory-less three-level quantization of $y_k$.

In the conventional receiver, conventional timing recovery is followed by a turbo equalizer 265, which iteratively exchanges information between a soft-in soft-out (SISO) equalizer 270 for the precoded PR-IV channel and an error-correction SISO Forward Error-Correction (FEC) decoder 275, both based on BCJR. The iterative exchange of information between SISO equalizer 270 and SISO FEC decoder 275 uses a de-interleaver 280 and an interleaver 285, as well as summation circuitry 290 and 295, in a conventional manner.

Figures 2, 3:
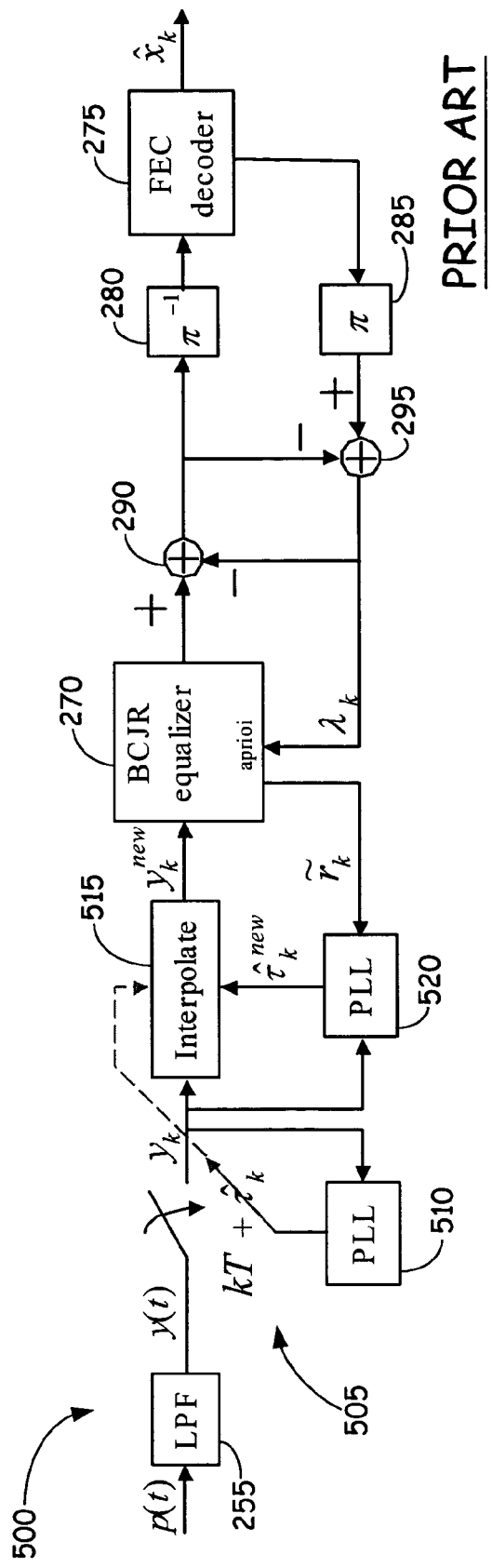
Figures 2, 3, 4:
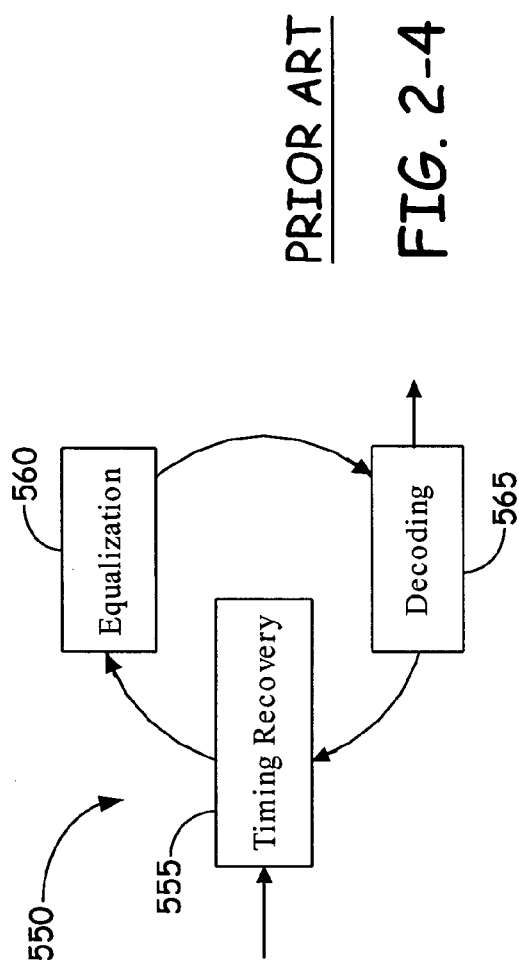
Figure 3:
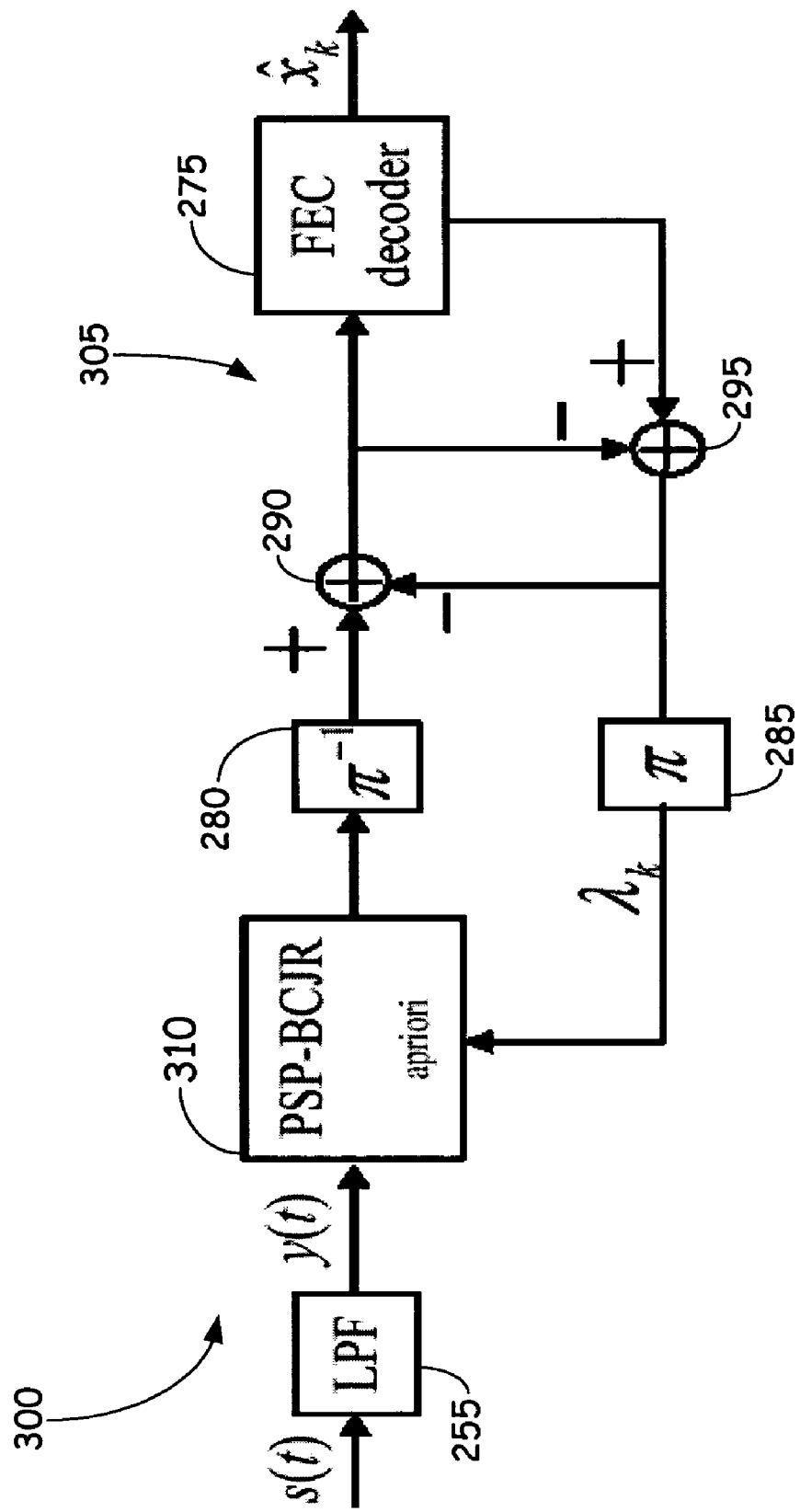
Figure 4:
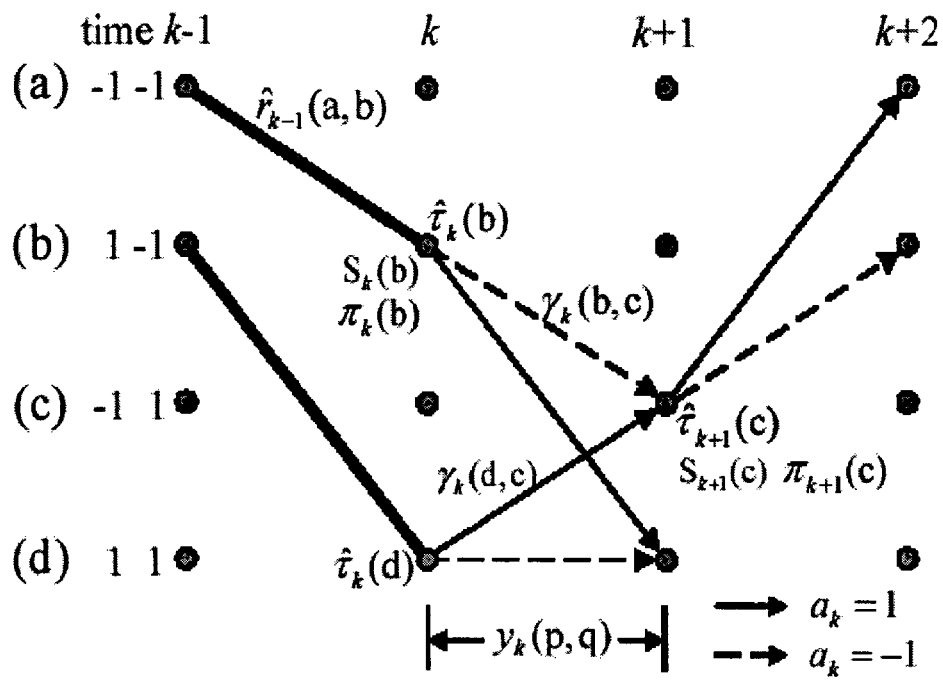

FIG. 2-3 is a block diagram of a front end receiver 500 of the type which implements NonPSP-ITR as discussed above. Receiver 500 has similar components to receiver 250 described above, but with different timing recovery circuit 505. Timing recovery circuit 505 includes first and second PLLs 510 and 520, and an interpolation circuit 515. NonPSP-ITR is realized by embedding the timing recovery step inside the turbo equalizer so as to perform timing recovery, equalization, and error-correction decoding jointly. After the first iteration, the turbo equalizer 270 produces soft estimates $\{\tilde{r}_k\}$, which might be more reliable than the decisions used in the previous iteration. By running the PLL again using the original readback signal with $\{\tilde{r}_k\}$, an improved set of timing estimates $\{\hat{\tau}_k^{new}\}$ can be obtained. Then, the new samples can be obtained by means of interpolation according to Equation 6-1:

$$y_k^{new} = \sum_i y_i q(kT - iT - \hat{\tau}_i + \hat{\tau}_k^{new}) \qquad \text{Equation 6-1}$$

where $q(t)$ is a sinc function. This set of samples is then fed to the turbo equalizer 270. In summary, timing recovery benefits from better decisions, and the turbo equalizer benefits from better samples. The process is illustrated in FIG. 2-4 with the steps of timing recovery 555, equalization 560 and decoding 565 being iteratively performed.

Iterative Timing Recovery of the Present Invention

To obtain a new iterative timing recovery scheme based on PSP, a description is first provided of the application of PSP to develop PSP-BCJR, which jointly performs timing recovery and equalization. With PSP-BCJR, a PSP-based iterative timing recovery scheme denoted as PSP-ITR is proposed, which performs timing recovery, equalization and decoding jointly, as shown in FIG. 3. FIG. 3 illustrates a receiver 300 in accordance with the present invention which embodies this concept. After low pass filter 255, analog signal $y(t)$ is provided to the PSP-BCJR equalizer 310 of a turbo equalizer 305. PSP-BCJR equalizer 310 and SISO FEC decoder 275 iteratively exchange information using de-interleaver 280 and an interleaver 285, as well as summation circuitry 290 and 295. In this document, a description of the operation of PSP-BCJR is provided only, because the interaction between PSP-BCJR 310 and an FEC decoder 275 is the same as performed in the turbo equalizer 265 shown in FIG. 2-2 (i.e., a PSP-BCJR block can be viewed as a BCJR equalizer). Also, it must be noted that while the present invention is described with reference to a PSP-BCJR algorithm and equalizer, the present invention applies generally to PSP-SDA algorithms and equalizers.

PSP-BCJR Algorithms

PSP-BCJR is realized by embedding the timing recovery inside the BCJR equalizer. The PSP-based timing recovery performs timing update operation at each state based on the history data obtained from the survivor path. Unfortunately, there is no such notion as a survivor path in the context of BCJR. In order to perform timing update operation inside BCJR, the concept of a virtual survivor path (or, simply, the survivor path) inside the BCJR is introduced. This survivor path can be easily obtained, once the best state transition leading to each state is determined.

PSP-BCJR has different sampling phase offsets associated with each state. Thus, the branch metrics at each stage of the trellis are calculated based on the sampling phase offset of the starting state. Since BCJR involves two recursions, namely forward and backward recursions, it is useful to perform timing update operation for both directions. The timing update operation during backward recursion will serve as refining the sampler outputs $\{y_k\}$, thus resulting in an improved set of $\{y_k\}$, which will be used to compute the log likelihood ratios (LLRs) of $\{\alpha_k\}$. For simplicity, some embodiments of the invention are restricted to the M&M TED algorithm when performing timing update.

Forward Recursion

Consider the trellis structure in FIG. 4, which demonstrates how PSP-BCJR of the present invention performs during forward recursion. There are $2^v=4$ states in this trellis, i.e., $Q=\{a,b,c,d\}$, where $v=2$ is a memory of the precoded PR-IV channel and Q is the set of states in the trellis. Define $\hat{\tau}_k(p)$ as the k-th forward sampling phase offset at state $\Psi_k=p$ (p being one of states a, b, c, d) which is used to sample y(t) at time k for the state transition emanating from $\Psi_k=p$, e.g., $y_k(p, q)= y(kT+\hat{\tau}_k(p))$, where $y_k(p, q)$ is the k-th sampler output associated with (p,q). The parameter $y_k(p,q)$ represents the signal obtained by going from branch q to branch p (where q and p are equal to a, b, c, d).

Consider the state transition at time k. There are two state transitions arriving at $\Psi_{k+1}=c$, i.e., (b,c) and (d,c). First, y(t) is sampled using the forward sampling phase offsets $\hat{\tau}_k(b)$ and $\hat{\tau}_k(d)$ to obtain $y_k(b,c)$ and $y_k(d,c)$, respectively. Next, $\gamma_k(b,c)$ and $\gamma_k(d,c)$ are computed in order to update $\alpha_{k+1}(c)$. The transition metric during forward recursion can be calculated using the relationship illustrated in Equation 6-2:

$$\gamma_k(a, b) = \exp\left\{-\frac{1}{2\sigma_n^2}|y_k(a, b) - \hat{r}_k(a, b)|^2 + \frac{\hat{a}_k(a, b)\lambda_k}{2}\right\} \quad \text{Equation 6-2}$$

Then, the starting state is chosen that corresponds to the best state transition leading to $\Psi_{k+1}=c$ by:

$$\hat{p} = \arg\max_{p\in\{b,d\}} \{Pr[\Psi_k = p, \Psi_{k+1} = c | y_k(p, c), y_{l<k}(p)]\} \quad \text{Equation 7}$$

$$= \arg\max_{p\in\{b,d\}} \left\{\frac{\alpha_k(p)\gamma_k(p, c)}{\sum_{\forall u} \alpha_{k+1}(u)}\right\}$$

$$= \arg\max_{p\in\{b,d\}} \{\alpha_k(p)\gamma_k(p, c)\}$$

where $y_{l<k}(p)$ is a collection of all previous sampler outputs associated with the survivor path leading to $\Psi_k=p$, and $u \in Q$.

Suppose (b,c) is the best state transition leading to $\Psi_{k+1}=c$ (i.e., $\hat{p}=b$). The algorithm then stores the starting state and the sampler output associated with (b,c) according to $S_{k+1}(c)=\{\Psi_k=b\}$ and $\pi_{k+1}(c)=y_k(b,c)$, respectively. Then, the next forward sampling phase offset is updated by $$\hat{\tau}_{k+1}(c) = \hat{\tau}_k(b) + \xi\hat{\epsilon}_k(b,c) \quad \text{Equation 8}$$

where $\hat{\epsilon}_k(b,c)$ is the k-th estimated timing error associated with (b,c), which is computed using the information from $S_k(b)$ and $\pi_k(b)$, i.e., $$\hat{\epsilon}_k(b, c) = \frac{3T}{16}\{y_k(b, c)\hat{r}_{k-1}(a, b) - y_{k-1}(a, b)\hat{r}_k(b, c)\} \quad \text{Equation 9}$$

This $\hat{\tau}_{k+1}(c)$ will be used to sample y(t) at time k+1 for the state transitions emanating from $\Psi_{k+1}=c$. This process is repeated from time k=0 to k=L+v−1.

There are many possibilities to exploit the forward sampling phase offsets in the timing update operation during backward recursion. The first example is to ignore the forward sampling phase offsets at all. Another example is to let each state in the trellis store its own forward sampling phase offset. Then, the algorithm can average the backward sampling phase offset at each state using the forward sampling phase offset associated with that state. Nonetheless, for description of an exemplary embodiment, it can be a goal to extract the best set of the forward sampling phase offsets denoted as $\{\hat{\tau}_k^{fw}\}$, which is obtained by tracing back the survivor path that maximizes $\alpha_{L+v}$. Hence, $\{\hat{\tau}_k^{fw}\}$ is used to average the backward sampling phase offset according to a certain criterion, as shall be seen later.

Note that the reasons for averaging the backward sampling phase offsets with the forward ones are: 1) to improve a set of $\{\gamma_k\}$, and 2) to avoid a cycle slip that might occur when the backward sampling phase offsets start deviating from the forward ones.

Backward Recursion

Figure 5:
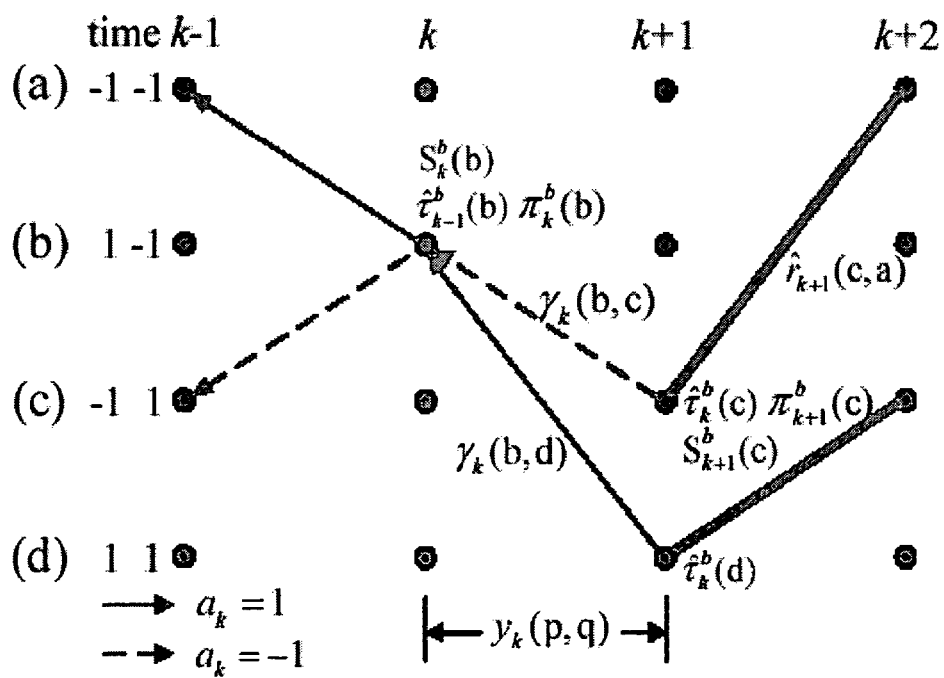
FIG. 5 is a trellis structure illustrating how PSP-BCJR performs during backward recursion.

Now consider backward recursion where the time index starts from k=L+v−1 to k=0. In order to explain how the timing update operation is performed during backward recursion, the virtual transition (or, simply, the backward transition) is introduced represented by the gray arrows as shown in FIG. 5, which explains how PSP-BCJR performs during backward recursion. Define $\hat{\tau}_k^b(q)$ as the k-th backward sampling phase offset at $\Psi_{k+1}=q$, which is employed to sample y(t) at time k during backward recursion, e.g., $y_k(p,q)=y(kT+\hat{\tau}_k^b(q))$. Consider the backward transition at time k. There are two backward transitions arriving at $\Psi_k=b$, which corresponds to (b,c) and (b,d). First, the algorithm samples y(t) using the backward sampling phase offsets $\hat{\tau}_k^b(c)$ and $\hat{\tau}_k^b(d)$ to obtain $y_k(b,c)$ and $y_k(b,d)$, respectively. Next, $\gamma_k(b,c)$ and $\gamma_k(b,d)$ are computed in order to update $\beta_k(b)$. The transition metric during backward recursion:

$$\gamma_k^b(a, b) = \exp\left\{-\frac{1}{2\sigma_n^2}|y_k^b(a, b) - \hat{r}_k(a, b)|^2 + \frac{\hat{a}_k(a, b)\lambda_k}{2}\right\} \quad \text{Equation 9-1}$$

Then, the starting state is chosen that corresponds to the best backward transition leading to $\Psi_k=b$ by $$\hat{q} = \arg\max_{q\in\{c,d\}} \{Pr[\Psi_k = b, \Psi_{k+1} = q | y_k(b, q), y_{l>k}(q)]\} \quad \text{Equation 10}$$

$$= \arg\max_{q\in\{c,d\}} \left\{\frac{\gamma_k(b, q)\beta_{k+1}(q)Pr[\Psi_k = b]}{\sum_{\forall u} \beta_k(u)Pr[\Psi_k = u]}\right\}$$

$$= \arg\max_{q\in\{c,d\}} \{\gamma_k(b, q)\beta_{k+1}(q)\}$$

where the third equality is obtained by ignoring all terms irrelevant to maximization, and $y_{l>k}(q)$ is a collection of all future sampler outputs associated with the survivor path that emanating from $\Psi_{k+1}=q$.

Suppose (b,c) corresponds to the best backward transition leading to $\Psi_k=b$ (i.e., $\hat{q}=c$). The algorithm stores the starting state and the sampler output associated with (b,c) according to $S_k^b(b)=c$ and $\pi_k^b(b)=y_k(b,c)$, respectively. Then, the next backward sampling phase offset is updated by $$\hat{\tau}_{k-1}^b(b) = \hat{\tau}_k^b(c) + \xi\hat{\epsilon}_k^b(b,c) \quad \text{Equation 11}$$

where $\hat{\epsilon}_k^b(b,c)$ is the k-th backward estimated timing error associated with (b,c), which is computed using the information from $S_{k+1}^b(c)$ and $\pi_{k+1}^b(c)$, i.e., $$\hat{\epsilon}_k^b(b, c) = \frac{3T}{16}\{y_k(b, c)\hat{r}_{k+1}(c, a) - y_{k+1}(c, a)\hat{r}_k(b, c)\} \quad \text{Equation 12}$$

To avoid a cycle slip when $\hat{\tau}_{k-1}^b(b)$ starts deviating from $\hat{\tau}_{k-1}^{fw}$, the backward sampling phase offset is averaged according to $$\hat{\tau}_{k-1}^b(b) = \begin{cases} (\hat{\tau}_{k-1}^b(b) + \hat{\tau}_{k-1}^{fw})/2 & \text{if } |\hat{\tau}_{k-1}^b(b) - \hat{\tau}_{k-1}^{fw}| > \Delta \\ \hat{\tau}_{k-1}^b(b) & \text{otherwise} \end{cases} \quad \text{Equation 13}$$

where $\Delta$ is the threshold that allows $\hat{\tau}_{k-1}^b(b)$ to deviate from $\hat{\tau}_{k-1}^{fw}$. In this document, we set $\Delta=0.1T$ to keep $\{\hat{\tau}_k^b\}$ close to $\{\hat{\tau}_k^{fw}\}$ so that the parameters $\{\alpha_k\}$ and $\{\beta_k\}$ will be optimized. This $\hat{\tau}_{k-1}^b(b)$ will be used to sample y(t) at time k−1 for the backward transitions emanating from $\Psi_k$=b.

This process is performed from time k=L+v−1 to k=0. Note that when performing the backward timing update operation, it is important to assure that the S-curve slope of Equation 12 during backward recursion is positive at the origin.

Summary of a PS-BCJR Algorithm Embodiment

1) Initialize forward recursion register values $\alpha_0$=[1 0 ... 0]
2) Forward recursion:

```
For k = 0,1, ... L + v − 1
    For q = {a,b,c,d}
        * Consider two transitions at time k arriving at Ψ_{k+1} = q,
            e.g., (p,q) and (u,q)
        * Compute γ_k(p,q) and γ_k(u,q)
        * Update α_{k+1}(q)
        * Choose the best state transition leading to Ψ_{k+1} = q
        * Update S_{k+1}(q)
        * Update π_{k+1}(q)
        * Update τ_{k+1}(q)
    End
End
```

4) Output $\hat{\tau}^{fw}$ from the survivor path that maximizes $\alpha_{L+V}$
5) Initialize backward recursion register values $\beta_{L+V}=\alpha_{L+V}$
6) Backward recursion:

```
For k = L + v − 1, L + v − 2, ... ,0
    For. p = {a, b, c, d}
        * Consider two backward transitions at time k arriving at
            Ψ_k = p , e.g., (p,q) and (p,u)
        * Compute γ_k(p,q) and γ_k(p,u)
        * Update β_k(p)
        * Choose the best backward transition leading to Ψ_k = p
        * Update S_k^b(p)
        * Update π_k^b(p)
        * Update τ_{k-1}^b(p)
    End
```

Compute $\lambda_k$ according to $$\lambda_k = \log\left\{\frac{\sum_{(p,q)\in A_k^{(+1)}} \alpha_k(p)\gamma_k(p,q)\beta_{k+1}(q)}{\sum_{(p,q)\in A_k^{(-1)}} \alpha_k(p)\gamma_k(p,q)\beta_{k+1}(q)}\right\} \quad \text{Equation 14}$$

End

Beyond the conventional BCJR, PSP-BCJR necessitates new storage requirements for:
- the forward/backward sampling phase offsets,
- the starting states,
- the sampler outputs.

For the PSP-BCJR algorithm described above, it can be necessary to store all $\{\pi_k(p)\}$, $\{\pi_k^b(p)\}$, $\{S_k^b(p)\}$ and $\{\hat{\tau}_k^b(p)\}$ only for previous and current stages so as to minimize memory requirement.

It is apparent that each survivor path has its own PLL to update the sampling phase offset. Therefore, for a PR-IV channel, PSP-BCJR requires eight PLLs, i.e., one PLL for each survivor path during both forward and backward recursions.

Simulation Results

This section compares the performance of PSP-ITR with the conventional receiver and NonPSP-ITR in the precoded PR-IV channel shown in FIG. 2-2. The analysis considers a rate-8/9 system in which a block of 3636 message bits is encoded by the rate−1/2 encoder with generator polynomial $$\left[1, \frac{1 \oplus D \oplus D^3 \oplus D^4}{1 \oplus D \oplus D^4}\right],$$

and then punctured to a block length of 4095 bits by retaining only every eighth parity bit. The punctured sequence passes through an s-random interleaver with s=16 to obtain an interleaved sequence of $\alpha_k$. Note that the PLL gain parameter, $\xi$, for different timing recovery schemes were optimized based on minimizing the RMS timing error $\sigma_\epsilon=\sqrt{E[(\tau_k-\hat{\tau}_k)^2]}$ at per-bit SNR, $E_b/N_0$, of 5 dB. The PLL gain parameters for different system conditions are shown in Table 1 of FIG. 5-1. Each bit-error rate (BER) point was computed using as many data sectors as possible until at least 100 sectors in error were collected at the 100-th iteration.

Figures 1, 5, 6:
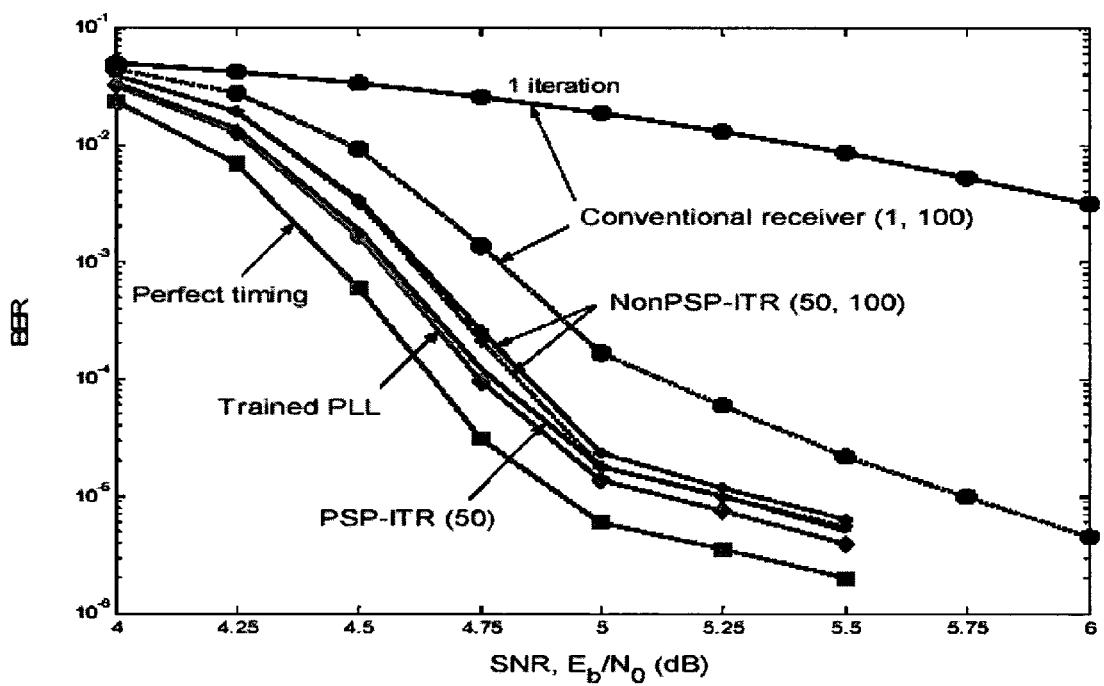
FIG. 6 is a plot illustrating performance comparisons of different timing recovery schemes with a phase offset $\sigma_w/T=0.5\%$.

FIG. 6 compares BER performance of different timing recovery schemes with a phase offset $\sigma_w/T$=0.5%, which represents low probability of the occurrence of cycle slips. The curve labeled "Perfect timing" means the conventional receiver using $\hat{\tau}_k=\tau_k$ to sample y(t). Furthermore, the curve labeled "Trained PLL" represents the conventional receiver whose PLL has access to all correct decisions, thus serving as a lower bound for all timing recovery schemes that are based on PLL. As depicted in FIG. 6, PSP-ITR performs slightly better than NonPSP-ITR at the 50-th iteration, and both yield about 0.45 dB gain at BER=$10^{-5}$ over the conventional receiver. Note that the performance of the conventional receiver at the 50-th and the 100-th iterations is alike (not shown). In addition, PSP-ITR performs close to the system with a trained PLL and is only 0.35 dB away from the system with perfect timing at BER=$10^{-5}$.

Figure 7:
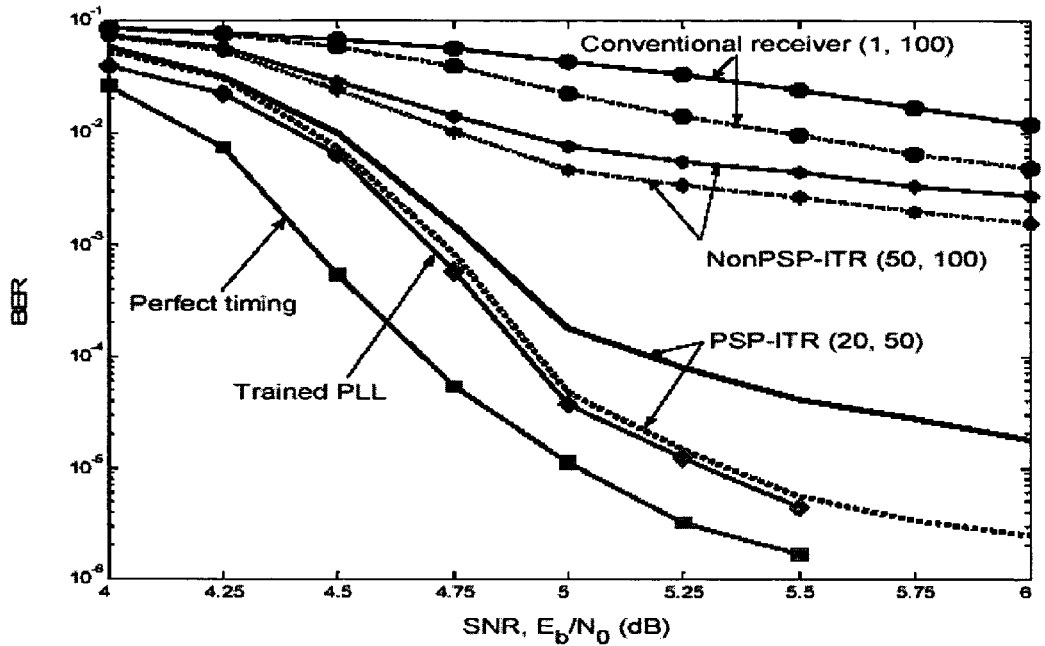
FIG. 7 is a plot illustrating performance comparisons of different timing recovery schemes with a phase offset $\sigma_w/T=1\%$.

Next, let us consider the system with a phase offset a, $\sigma_w/T$=1%, which represents high probability of the occurrence of cycle slips. FIG. 7 shows BER performance of different timing recovery schemes with $\sigma_w/T$=1%. NonPSP-ITR still outperforms the conventional receiver; however, it seems to have an error floor at high BER. On the other hand, PSP-ITR provides a huge performance gain over NonPSP-ITR and starts having an error floor at low BER. Again, PSP-ITR still performs similar to the system with a trained PLL and loses approximately 0.35 dB from the system with perfect timing at BER=$10^{-5}$.

Figure 8:
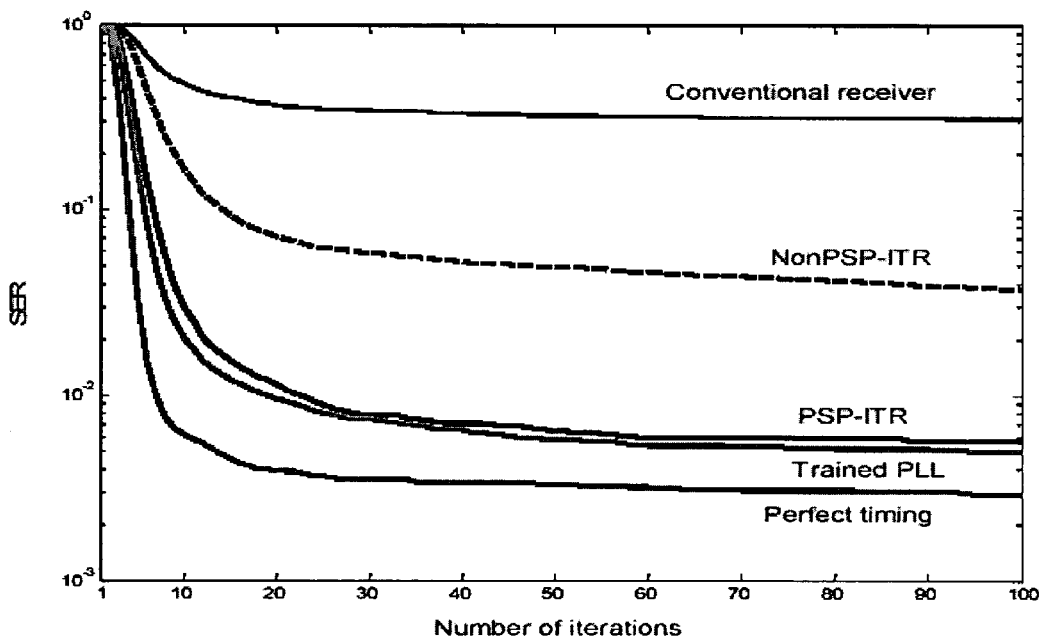
FIG. 8 is a plot illustrating convergence rates of different timing recovery schemes at SNR=5 dB and $\sigma_w/T=1\%$.

The reason that PSP-ITR outperforms NonPSP-ITR when the phase offset $\sigma_w/T$ is large is because the front-end PLL used in NonPSP-ITR does not work well compared to the PSP-based timing recovery. Additionally, PSP-ITR can automatically correct a cycle slip (without a cycle slip detection and correction technique as used in NonPSP-ITR) much more efficiently than NonPSP-ITR. In other words, PSP-ITR achieves faster convergence than NonPSP-ITR, which can be confirmed by plotting the sector-error rate (SER) versus the number of iterations in FIG. 8. The convergence rate plot illustrated in FIG. 8 is for different timing recovery schemes at SNR=5 dB and the phase offset $\sigma_w/T=1\%$. The convergence rate of PSP-ITR takes about 30 iterations to provide a good performance. Conversely, NonPSP-ITR takes hundreds of iterations to yield a good performance (not shown).

Figure 9:
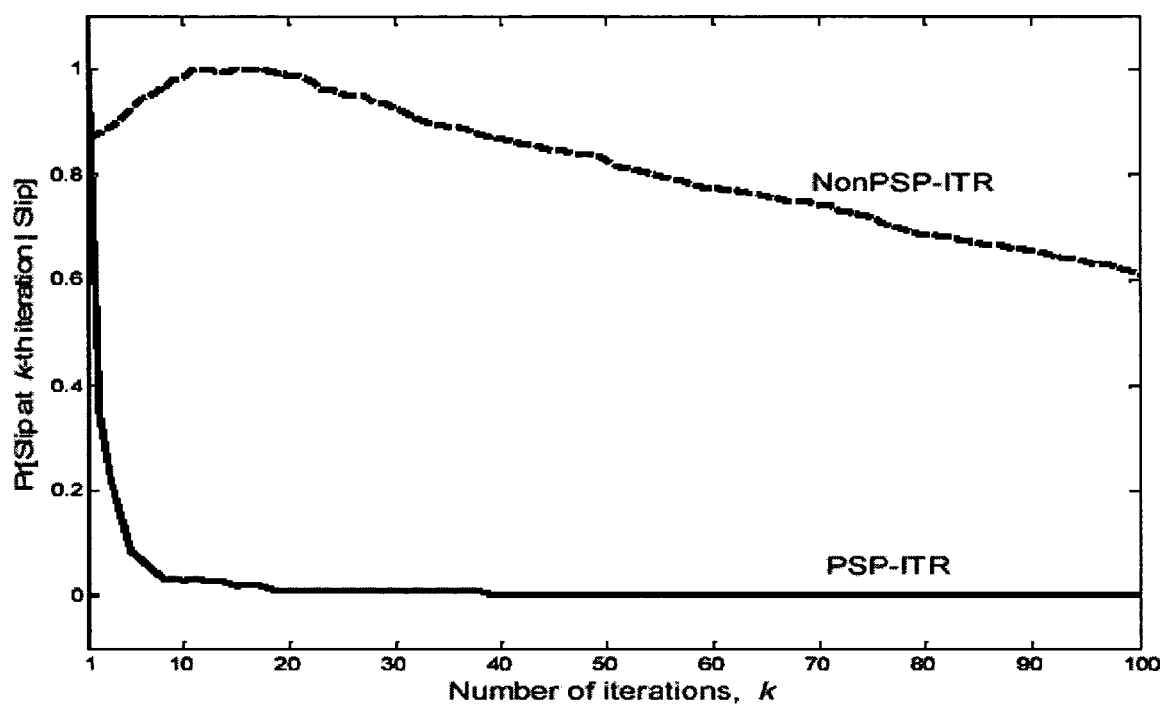
FIG. 9 is a plot illustrating probability of cycle slip correction at SNR=5 dB and $\sigma_w/T=1\%$.

FIG. 9 illustrates a plot of the probability of the occurrence of the cycle slip at the k-th iteration, given the occurrence of the cycle slip. The plot is of the probability of cycle slip correction at SNR=5 dB and the phase offset $\sigma_w/T=1\%$. This plot shows how fast each timing recovery scheme can correct a cycle slip. Note that, in this experiment, a cycle slip is declared when the actual timing offset and the estimated one are 0.75T apart from each other for more than 100 consecutive bit periods. Apparently, NonPSP-ITR requires a large number of iterations in order to correct a cycle slip as opposed to PSP-ITR. This is because NonPSP-ITR can only correct a cycle slip when there is a sudden phase change in the estimated timing offsets, not in the actual ones. Note that the reason that NonPSP-ITR increases a probability of the occurrence of the cycle slip at the first 10 iterations (see FIG. 9) is because NonPSP-ITR takes a few iterations to recognize a cycle slip.

Figures 2, 10:
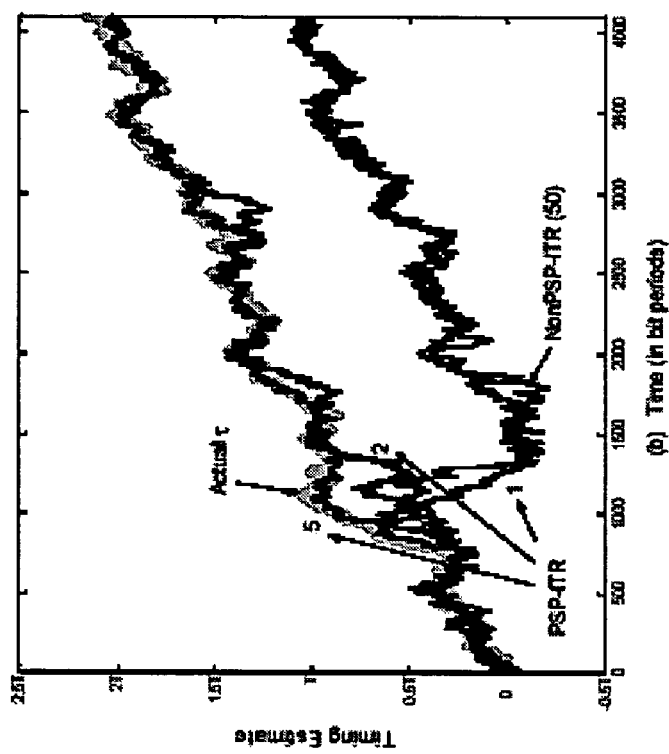
Figures 1, 10:
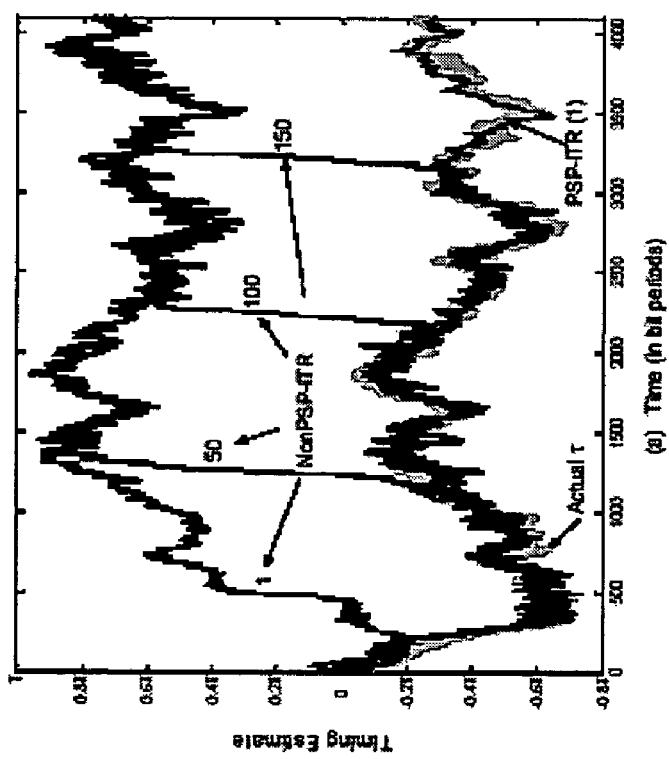

It is also worth plotting the estimated timing offset obtained from NonPSP-ITR and PSP-ITR for two different sample packets, at SNR=5 dB and phase offset $\sigma_w/T=1\%$, as shown in FIGS. 10-1 and 10-2. As illustrated in FIG. 10-1, NonPSP-ITR takes about 200 iterations to correct a cycle slip (not shown), whereas PSP-ITR takes only one iteration to do so. Similarly, FIG. 10-2 indicates that PSP-ITR can correct a cycle slip within 5 iterations but NonPSP-ITR cannot correct a cycle slip even with 50 iterations.

Figure 11:
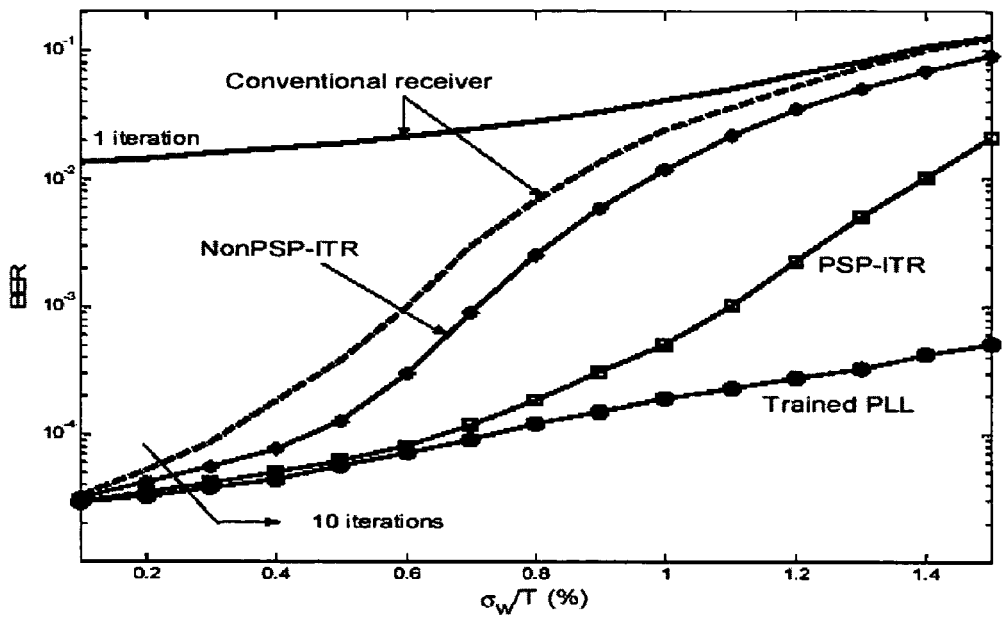
FIG. 11 is a plot illustrating performance comparisons of different timing recovery schemes as a function of a $\sigma_w/T$'s at SNR=5 dB.

In order to verify that PSP-ITR outperforms NonPSP-ITR, especially when $\tau_v/T$ is high, BER performance of different timing recovery schemes (with 10 iterations) as a function of $\sigma_w/T$'s at SNR=5 dB is plotted in FIG. 11, where the PLL gain parameters were optimized for each timing recovery scheme and each $\sigma_w/T$. As shown in FIG. 11, the performance of both the conventional receiver and NonPSP-ITR with 10 iterations decreases dramatically as $\sigma_w/T$ increases. This implies that the conventional receiver and NonPSP-ITR does not work well when $\sigma_w/T$ is large. On the other hand, PSP-ITR still provides a large performance gain even when $\sigma_w/T=1.5\%$. Furthermore, PSP-ITR performs as good as the system with a trained PLL does up to $\sigma_w/T=0.6\%$. This suggests that PSP-ITR is much more robust to the severe timing jitter than NonPSP-ITR.

Simulation Results with an Equalized Channel

Figure 12:
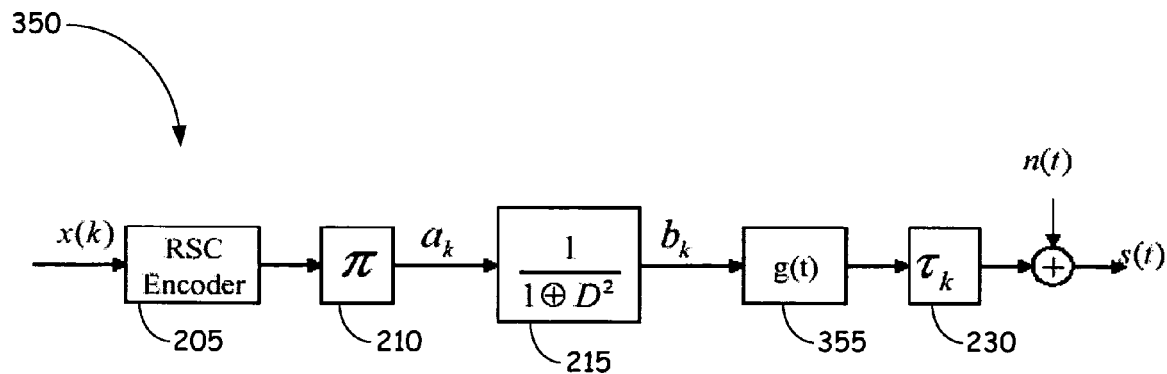
FIG. 12 is a block diagram illustrating data encoding with a recording channel.

Until now, this disclosure has assumed the ideal channel model in FIG. 2-1. Now, the new iterative timing recovery algorithm of the present invention is also applied to the equalized channel 350 shown in FIG. 12. In FIG. 12, recording channel 350 is shown to include components similar to those included in channel 200 illustrated in FIG. 2-1. These components share the same reference numbers. In FIG. 12, g(t) represents the transition response of the magnetic channel implemented in circuit 355.

The transition response for a longitudinal recording channel (usually known as a Lorentzian pulse) is given by $$g(t) = \frac{K}{1+\left(\frac{2t}{PW_{50}}\right)^2} \qquad \text{Equation 15}$$

where K is a scaling constant and $PW_{50}$ indicates the width of the Lorentzian pulse at half of its peak value. Similarly, the transition response for a perpendicular recording channel is given by $$g(t) = \text{erf}\left(\frac{2t\sqrt{\ln 2}}{PW_{50}}\right) \qquad \text{Equation 16}$$

where erf(·) is an error function which is defined by $$\text{erf}(x) = \frac{2}{\sqrt{\pi}}\int_0^x e^{-t^2}dt,$$

and $PW_{50}$ determines the width of the derivative of g(t) at half its maximum. The ratio, normalized density, $ND=PW_{50}/T$ represents the normalized recording density which defines how many data bits can be packed within the resolution unit $PW_{50}$, and the dibit response (the pulse resulting from two transitions corresponding to one bit) is defined as h(t)=g(t)−g(t−T).

After convolving the transition sequence $d_k$ with the transition response g(t), electronic noise is added in the system through the SNR value definition given as $$SNR = 10\log\frac{E_i}{\sigma^2} \qquad \text{Equation 17}$$

where $E_i$ is the energy of the impulse response of the recording channel, and $\sigma^2$ is the power of the electronic noise. For convenience, the impulse response of the recording channel is normalized so that $E_i$ becomes unity.

Figure 13:
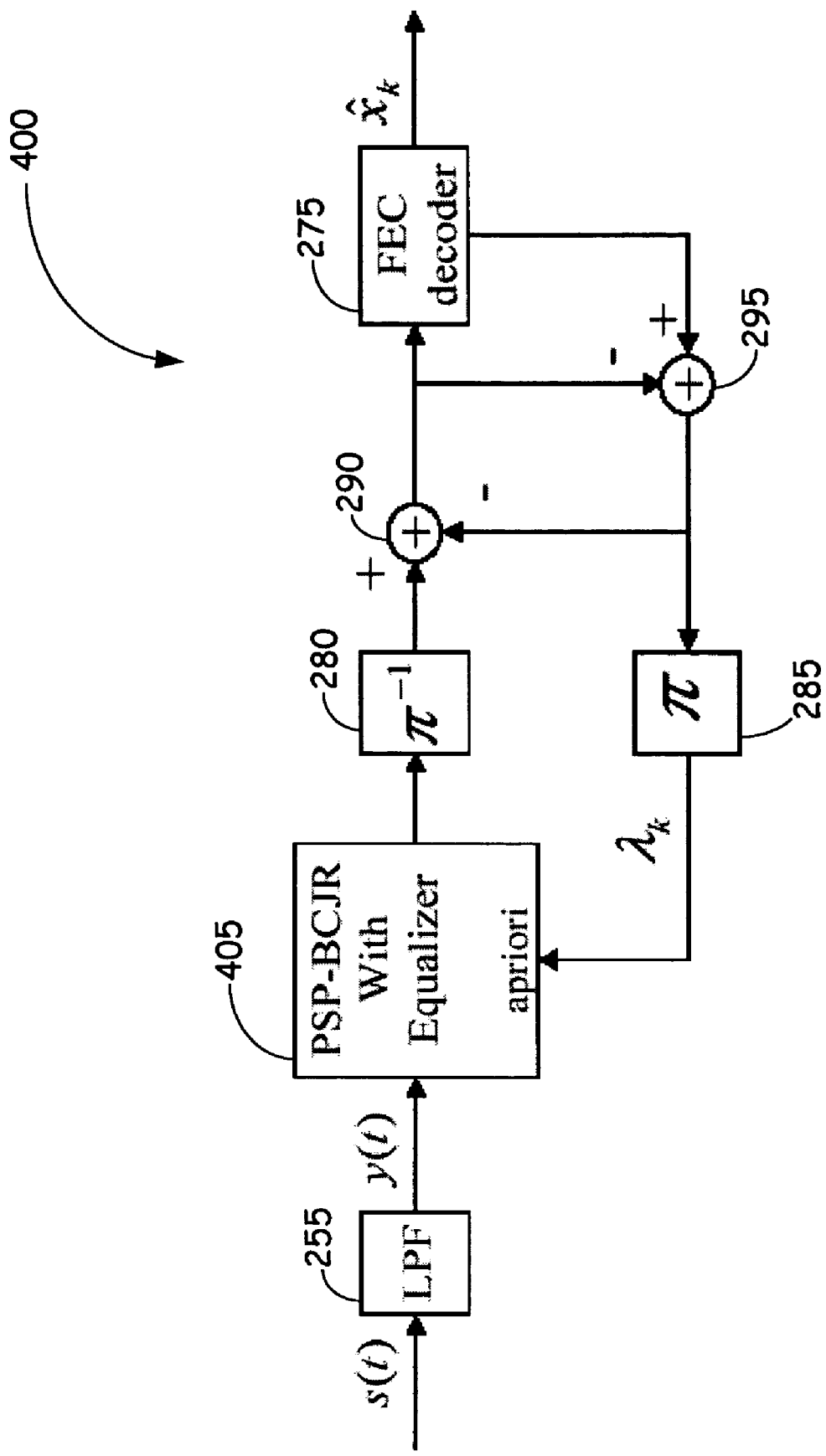
FIG. 13 is a block diagram illustrating a PSP-based iterative timing recovery architecture.

FIG. 13 illustrates a PSP-based iterative timing recovery receiver or architecture 400 in accordance with another embodiment of the present invention. As can be seen from FIG. 13 the readback signal is first low pass filtered by LPF 255, then processed by the "PSP-BCJR With Equalizer" block or circuit 405. The difference between this block and the equalizer 310 in FIG. 3 is that PSP-BCJR 405 implements a finite impulse response (FIR) equalizer F(z) at each of its branches after adjusting the samples both during forward and backward recursion. The purpose of this equalizer is to equalize the recording channel to a target response G(z).

The plots in FIG. 14 and FIG. 15 show the cycle slip correction timing estimates as a function of time (in bit periods) for both longitudinal and perpendicular magnetic recording channels, respectively. To obtain those figures
  ND=2 is considered for both longitudinal and perpendicular magnetic recording channels.
  Clock jitter noise in the system is assumed to be 0.5%, media jitter noise to be 3%, and frequency offset to be 0.4% of the bit period.

The 3-tap General Partial Response (GPR) target and its corresponding 21-tap equalizer is designed at Bit-Error-Rate (BER) equal to $10^{-5}$ based on the uncoded channel model without any clock jitter, media jitter, and frequency offset effects. The corresponding GPR target for longitudinal channel is [1 0.0986-0.7015], and for perpendicular channel [1 1.1482 0.4751].

A second order timing recovery loop is used. PLL gain parameters are designed to catch the phase and frequency offsets within 256 bit periods (which is the length of the preamble within each data sector) based on a linearized PLL model assuming no noise in the system. The same PLL gain parameters are then used for both acquisition and tracking of timing information.

Looking at those FIGS. 14 and 15, it can be seen that the trend is very similar to the one in FIG. 10 which corresponds to a PR-IV channel. In other words, for equalized longitudinal and perpendicular channels, it can again be seen that the cycle slip is corrected at the end of the second iteration for the timing recovery algorithm of the present invention, while it requires tens of iteration for its counterpart in literature. Of course, such a behavior results into very similar performance plots shown for the PR-IV channel in FIG. 6, and in FIG. 7 for the equalized channel case also.

Reduction in Implementation Complexity

If one considers the proposed architecture in FIG. 3, or its version with equalizers at each branch in FIG. 13, it can be seen that these architectures get the low-pass filtered analog signal y(t) as their input, and then process this signal within the PSP-BCJR block to output channel bit estimates in the digital domain. This requires Analog-to-Digital (A/D) converters at each branch of the PSP-BCJR block. Implementing those A/D blocks in detector branches increases the implementation complexity.

Figure 16:
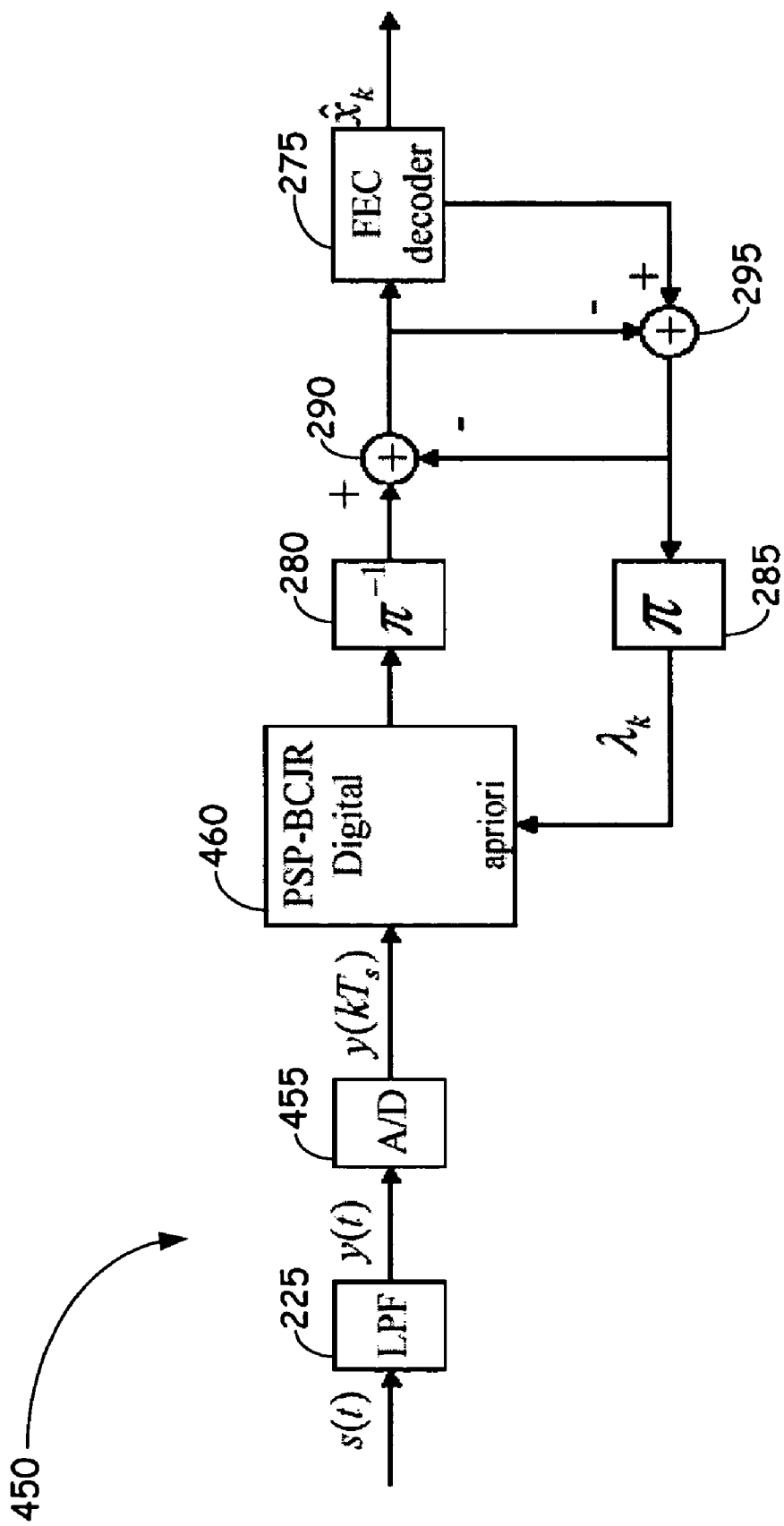
FIG. 16 is a block diagram illustrating a PSP-based iterative timing recovery architecture.

The complexity of the architecture in those FIGS. can be reduced by applying the idea of interpolated timing recovery, and converting to the receiver architecture 450 shown in FIG. 16. As seen from this FIG., the analog signal y(t) is first sampled using an A/D converter 455 with a fixed sampling clock period $T_s$. It is sufficient to have $T_s$ to be only 5% to 10% larger than the channel bit duration T. The output of the A/D converter 455 is the samples of the digital signal $y(kT_s)$ to be processed with the digital version of the PSP-BCJR block or equalizer 460. The digital version 460 of this block in FIG. 16 is essentially the same as the PSP-BCJR block 310 in FIG. 3 or block 405 in FIG. 13. The main difference is, block 460 implements interpolation filters in place of A/D blocks at each of its branches.

The previous studies have shown that interpolated timing recovery, once configured correctly, results into essentially the same system performance compared with a timing loop employing hybrid A/D blocks. Thus, the architecture in FIG. 16 should also result into the same system performance as the ones illustrated in FIG. 3 or FIG. 13.

SUMMARY

In accordance with embodiments of the present invention, PSP is applied to develop PSP-BCJR (or other PSP-SDA) for performing timing recovery and equalization jointly. With PSP-BCJR, a PSP-based iterative timing recovery scheme was provided, denoted as PSP-ITR, for coded PR channels. The proposed scheme iteratively exchanges soft information between PSP-BCJR and an error-correction decoder.

Simulation results have shown that PSP-ITR outperforms NonPSP-ITR, especially when $\sigma_w/T$ is large. This is primarily because PSP-ITR can automatically correct a cycle slip much more efficiently than NonPSP-ITR. In other words, PSP-ITR requires much less number of turbo iterations to correct a cycle slip than NonPSP-ITR. In addition, it has been observed that PSP-ITR performs similar to the system with a trained PLL at the 50-th iteration for $\sigma_w/T$ up to 1%.

In accordance with embodiments of the present invention, a method of reducing the implementation complexity of the new PSP-based iterative timing recovery scheme is provided. The idea of interpolated timing recovery is employed to get rid of the hybrid A/D blocks within every branch of the PSP-BJCR architecture. Instead, those blocks are replaced with interpolation filters, which are simpler to implement compared to A/D blocks.

The PSP method can also be applied to Soft Output Viterbi Algorithm (SOVA) type soft output detectors, and those soft outputs can be used within the channel iteration.

Appendix A

Purpose

This Appendix further investigates the performance gain of the Per-Survivor Processing Iterative Timing Recovery (PSP-ITR) architecture provided above against the most recently proposed iterative timing recovery. In this Appendix, the most recently proposed iterative timing recovery method is again referred to as Non-PSP-ITR. Current and future magnetic recording products are taken as the base systems at low Signal-to-Noise-Ratio (SNR) regions to quantify the improvement in performance. It is worth noting that Non-PSP-ITR is not the algorithm that is implemented in current products. When needed, to quantify the performance of the timing recovery architecture implemented in current read-channel architectures, plots are labeled as "conventional receiver" to compare with PSP-ITR. The organization of this Appendix is as follows: After a brief introduction, recent investigations on quantifying timing errors in today's recording architectures are presented. Then, the spindle speed variation is taken as a case study, and a comparison is made between the different timing recovery architectures.

Introduction

Referring back to FIG. 11 described earlier, shown was the Bit-Error-Rate (BER) performance comparison of different timing recovery schemes as a function of percent phase jitter $\sigma_w/T$ at SNR equal to 5 dB (low SNR value) for perfectly equalized PR-IV channel. FIG. 11 shows the system with only electronic noise. In order to see the effects of different noise mixes, we also compared the timing recovery architectures with 5% media jitter noise (medium media jitter noise) on top of electronic noise of 5 dB (FIG. 17), and with electronic noise of 10 dB (medium electronic noise) and the media jitter noise to be 10% (high media jitter noise) (FIG. 18). The inventors have also tried different target responses, and different magnetic recording channels (perpendicular and longitudinal recording channels with different normalized densities), and observed similar behavior.

Figure 17:
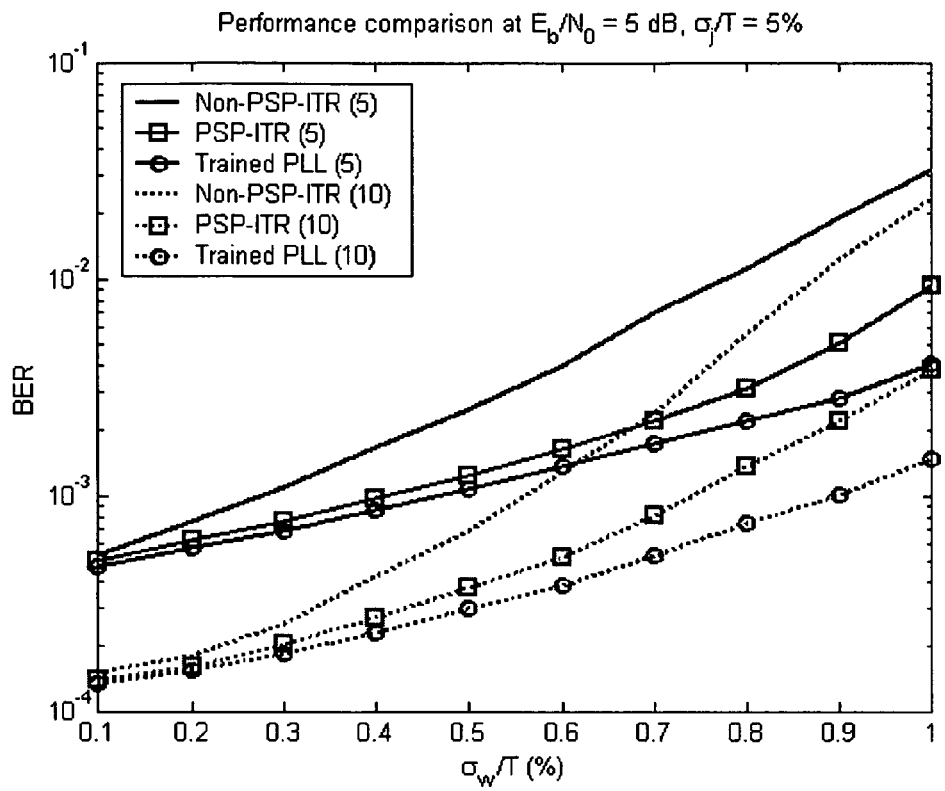
FIG. 17 is a plot illustrating BER versus $\sigma_w/T$ for different timing recovery schemes at SNR=5 dB and media jitter of 5%.
Figure 18:
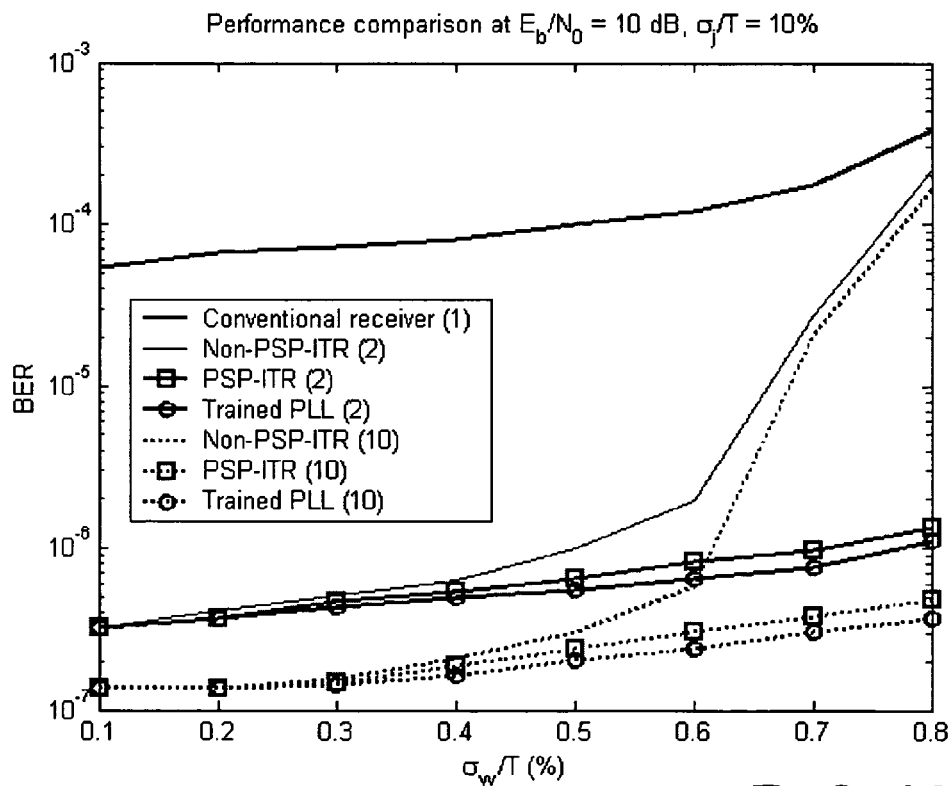
FIG. 18 is a plot illustrating BER versus $\sigma_w/T$ for different timing recovery schemes at SNR=10 dB and media jitter of 10%.

Looking at FIGS. 11, 17 and 18, similar trends can be seen, i.e.,

At low phase jitter percentage values ($\sigma_w/T<0.3$) small performance difference between the Non-PSP-ITR and the PSP-ITR is observed.

When the jitter percentage value becomes high, the performance difference also increases.

Thus, the question which this Appendix addresses, i.e., "What is the performance gain of the Per-Survivor Processing Iterative Timing Recovery (PSP-ITR) architecture proposed above?" highly depends on the amount of timing errors in the system. In other words, where do we operate on $\sigma_w/T$ axis of those plots? Is there any frequency offset in the system? If there is, what is the realistic amount of frequency offset, and how does it affect the system performance? In order to find answers to these questions, a number of resources were utilized.

Timing Errors in Magnetic Recording Architectures
The information presented here can be itemized as:
The clock jitter coming from crystal clock is very small (0.01%) and can be neglected.
The frequency offset in the system should also be considered.
The dominant effect, which causes the timing errors in the system, is spindle speed variations. It is specified as 0.1% of the sampling clock for write-process, and 0.1% for read-process. Thus, the overall worst case effect is 0.2%.
There are also other effects, which will cause timing errors in the system. For example:
When the head moves off-track this causes the phase of the waveform to shift because of the interaction of data at neighboring tracks.
Fly-height modulation will also cause phase changes.
The air-bearing resonance will cause sudden phase changes because of bumps on the medium.

Among the items above, some will translate into phase jitter in the system, some will be the source of frequency offset, and some will result into sudden phase offsets. Here, we will take the spindle speed variation as a case study because its effect is well quantified.

A Case Study—Effect of Spindle Speed Variation

First assume that all the spindle speed variation will be transferred into phase jitter. In other words, the value of a $\sigma_w/T$ in FIGS. 11, 17 and 18 above will be 0.2. From those FIGS., it can be seen that the proposed PSP-ITR architecture is performing similar to Non-PSP-ITR architecture in literature.

However, for future magnetic recording architectures with higher areal densities the T value will reduce, which can result in higher $\sigma_w/T$ values. For example, currently 80 Gbyte per platter products are available. The platter diameter is 3.5 inch with a hole of diameter 1.8 inch in the middle. This means that the area to write data is $\pi(1.75^2-0.9^2)$, or 7.08 square inches. Each side of the platter is written to, thus the area becomes 14.18 square inches. Eighty 80 Gbytes or 80*8 Gbits of information is stored on that area, which translates into around 45 Gbits per square inch of areal density. For future products of say 500 Gbits per square inch eleven times more areal density will be required. Similarly, for 1 Tbits per square inch twenty-two times more areal density will be required. Assuming the Bit-Aspect-Ratio (BAR) and the rotation speed of the future product to be same as today's, then one ends up with 3.32 and 4.69 times reductions in bit period (T) for 500 Gbits and 1 Tbits per square inch designs, respectively. Thus, the result is 3.32 times and 4.69 times more $\sigma_w/T$ in the system. Then the spindle speed effect will be 0.66 and 0.938 percent of the bit period. Looking now at the plots in FIGS. 11, 17 and 18, and comparing the performances of the architectures at those points, system performance gains can be seen ranging from 1 decade to 2 decades.

Figure 19:
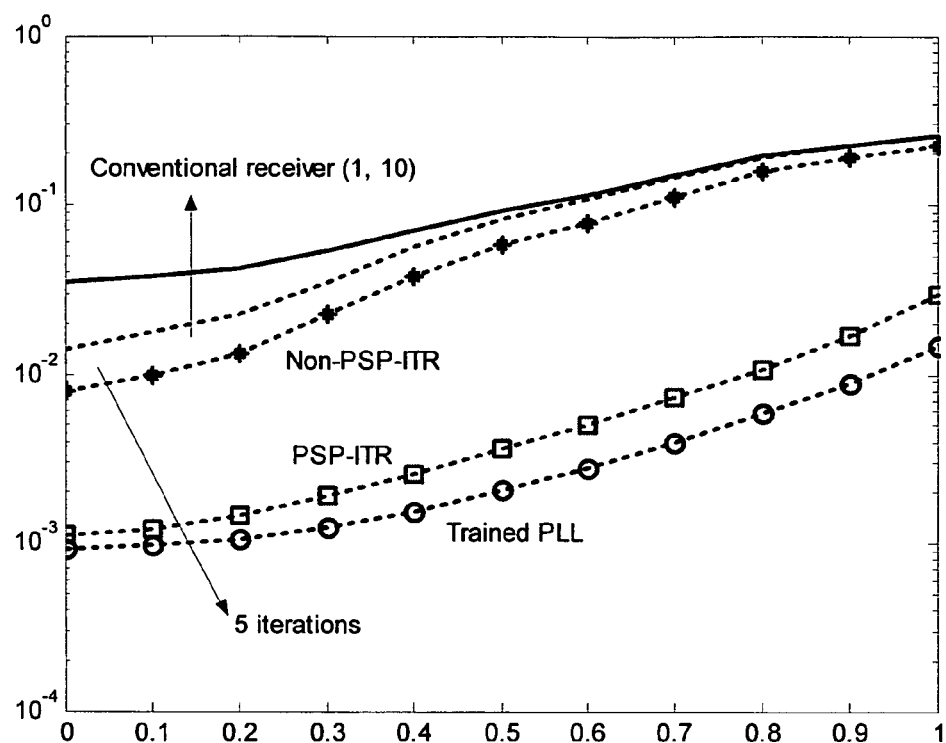
FIG. 19 is a plot illustrating performance comparisons after five iterations at $E_b/N_0$=5 dB, $\sigma_t/T$=5%, frequency offset=0.3%, $\alpha_{200}\beta_{200}$.
Figure 20:
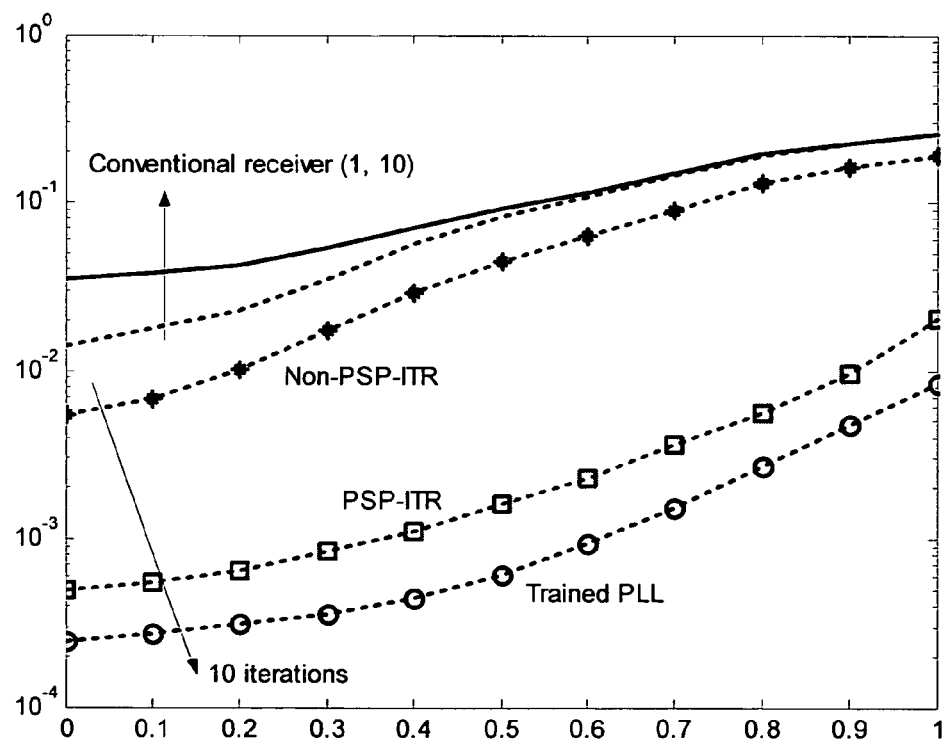
FIG. 20 is a plot illustrating performance comparisons after ten iterations at $E_b/N_0$=5 dB, $\sigma_t/T$=5%, frequency offset=0.3%, $\alpha_{200}\beta_{200}$.

The spindle speed variation is a slow process compared to sampling time of the channel. Any variations of that will be almost constant within a sector of data. Thus, rather than phase offset, most of it will be translated into frequency offset in the system. Among the other frequency-offset sources, the spindle speed takes a dominant effect. Thus, next consider all the spindle speed variation as a frequency offset in the system. For analysis sake, a frequency offset of 0.3% was assumed to be the nominal value (0.2% coming from spindle speed and 0.1% from other sources). The plots mentioned up until now don't include the frequency offset effect. New simulations with this specific offset value were run, and the results are shown in FIGS. 19 and 20. The following is observed from these FIGS:

Even at 0% phase jitter value $\sigma_w/T$, almost a decade improvement is seen with the proposed PSP-ITR architecture over the Non-PSP-ITR architecture;
The proposed PSP-ITR architecture is close to Trained PLL architecture performance. The Trained PLL refers to the limit which can be achieved with a PLL loop. Thus, the PSP-ITR method achieves close to the limit.
The PSP-ITR architecture results into a better performance with 5 iterations (FIG. 4) than the Non-PSP-ITR architecture with 10 iterations (FIG. 5). Thus, better performance is achieved with less iterations, which means reduced complexity coming from code iterations.

SUMMARY AND CONCLUSION

It has been discovered that spindle speed variation is a key parameter. Assuming the spindle speed variation contributes only to phase jitter, the benefit of the proposed algorithm is demonstrated for future high areal density products. On the other hand, assuming that the spindle speed variation contributes solely to frequency offset, the benefit of PSP-ITR can be seen even for current recording architectures.

In addition to spindle speed variations, there are also other disturbances in the system, which affect timing errors. Some of those disturbances are heads sliding to off-track, fly-height modulation, and air-bearing resonance. As PSP-ITR is more robust than the conventional algorithms implemented on the chip and the ones proposed in literature, it is submitted that PSP-ITR will also behave better in presence of those other disturbances. In conclusion, the PSP-ITR architecture can be used to increase the performance and improve the robustness of both today's and future recording products.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the recording system while maintaining substantially the same functionality without departing from the scope and spirit of the present invention.

What is claimed is:
1. A method comprising:
receiving a signal indicative of data bits; and
performing per survivor processing-iterative timing recovery (PSP-ITR) on the received signal to determine per survivor timing recovery data and to use the survivor timing recovery data to generate probabilities of the data bits;
wherein performing PSP-ITR on the received signal further comprises processing the received signal using a per survivor processing-soft decision algorithm (PSP-SDA) which jointly performs timing recovery and equalization;

wherein processing the received signal using a PSP-SDA algorithm further comprises:
calculating a plurality of branch metrics, with each branch metric corresponding to a transition branch between states in a trellis; and
identifying a survivor path between the states as a function of the calculated branch metrics;

wherein each state has an associated sampling phase offset used to sample the received signal, at least some of the sampling phase offsets being different from one another, and wherein the step of calculating the plurality of branch metrics further comprises calculating each branch metric as a function of the sampling phase offset at a starting state of the corresponding branch; and wherein calculating the plurality of branch metrics further comprises:
performing a timing update operation in a forward direction based on the per survivor timing recovery data; and
calculating a plurality of transition metrics during forward recursions.

2. The method of claim 1, wherein processing the received signal using a PSP-SDA algorithm comprises processing the received signal using a Bahl, Cocke, Jelinek, and Raviv (BCJR) algorithm configured to implement per survivor processing (PSP) to jointly perform timing recovery and equalization.

3. The method of claim 1, wherein processing the received signal using a PSP-SDA algorithm comprises processing the received signal using a Soft Output Viterbi Algorithm (SOVA) configured to implement per survivor processing (PSP) to jointly perform timing recovery and equalization.

4. The method of claim 1, wherein calculating the plurality of branch metrics further comprises:
performing a timing update operation in a backward direction based on the per survivor timing recovery data; and
calculating a plurality of transition metrics during backward recursions.

5. The method of claim 4, wherein performing per survivor processing-iterative timing recovery (PSP-ITR) on the received signal to generate the probabilities of the data bits further comprises generating the probabilities of the data bits as a function of the transition metrics calculated during the forward and backward recursions.

6. The method of claim 1, wherein performing PSP-ITR on the received signal to generate probabilities of the data bits further comprises performing interpolated timing recovery on the received signal.

7. The method of claim 6, wherein performing interpolated timing recovery on the received signal further comprises:
sampling the received signal with an analog-to-digital converter with a fixed sampling clock period to generate samples of a digital signal;
processing the samples of the digital signal using a per survivor processing-soft decision algorithm (PSP-SDA) which jointly performs timing recovery and equalization, wherein the PSP-SDA processes the generated samples of the digital signal using interpolation filters in each of its branches.

8. An apparatus for processing a signal indicative of data bits, the apparatus comprising:
a low pass filter which receives the signal indicative of the data bits and provides as an output a filtered analog signal; and
a per survivor processing-iterative timing recovery (PSP-ITR) equalizer which performs PSP-ITR on the filtered analog signal to generate timing recovery data used to update sample outputs used to calculate probabilities of the data bits;

wherein the per survivor processing-iterative timing recovery (PSP-ITR) equalizer is configured to process the received signal using a per survivor processing-soft decision algorithm (PSP-SDA) which jointly performs timing recovery and equalization by calculating a plurality of branch metrics, with each branch metric corresponding to a transition branch between states in a trellis and by identifying a survivor path between the states as a function of the calculated branch metrics;

wherein each state has an associated sampling phase offset used to sample the received signal, at least some of the sampling phase offsets being different from one another, and the plurality of branch metrics are calculated by calculating each branch metric as a function of the sampling phase offset at a starting state of the corresponding branch, performing a timing update operation in a forward direction based on the per survivor timing recovery data, and calculating a plurality of transition metrics during forward recursions.

9. The apparatus of claim 8, and further comprising a turbo equalizer including the PSP-ITR equalizer and a decoder which iteratively exchange information to generate the probabilities of the data bits.

10. The apparatus of claim 9, wherein the PSP-ITR equalizer is a per survivor processing-soft decision algorithm (PSP-SDA) equalizer which jointly performs timing recovery and equalization.

11. The apparatus of claim 10, wherein the PSP-SDA equalizer is a per survivor processing (PSP) Bahl, Cocke, Jelinek, and Raviv (BCJR) equalizer, the PSP-BCJR equalizer adapted to use timing recovery data determined from survivor paths to perform a timing update operation within the PSP-BCJR equalizer at each state based on history data obtained from the survivor paths.

12. The apparatus of claim 10, wherein the PSP-SDA equalizer is a per survivor processing (PSP) Soft Output Viterbi Algorithm (SOVA) equalizer, the PSP-SOVA equalizer adapted to use timing recovery data determined from survivor paths to perform a timing update operation within the PSP-SOVA equalizer at each state based on history data obtained from the survivor paths.

13. The apparatus of claim 10 and further comprising an analog-to-digital converter coupled between the low pass filter and the PSP-ITR equalizer, the analog-to digital converter sampling the filtered analog signal and generating samples of a digital signal, wherein the PSP-ITR equalizer processes the generated samples of the digital signal using interpolation filters in each of its branches.

14. A decoder to determine a plurality of data bits from a received signal, the decoder comprising:
a per survivor path (PSP) soft-decision algorithm (SDA) equalizer adapted to use a survivor processing-iterative timing recovery (PSP-ITR) algorithm to determine per survivor timing recovery data associated with survivor paths determined from the received signal and to update each state of a trellis of a soft-decision algorithm with the per survivor timing recovery data at each iteration, the PSP-SDA equalizer adapted to iteratively determine probabilities of the data bits based on the per survivor timing recovery data;
wherein the per survivor processing-iterative timing recovery (PSP-ITR) equalizer is configured to process the received signal using a per survivor processing-soft decision algorithm (PSP-SDA) which jointly performs timing recovery and equalization by calculating a plurality of branch metrics, with each branch metric corresponding to a transition branch between states in a trellis and by identifying a survivor path between the states as a function of the calculated branch metrics; and wherein each state has an associated sampling phase offset used to sample the received signal, at least some of the sampling phase offsets being different from one another, where each branch metric of the plurality of branch metrics is calculated as a function of the sampling phase offset at a starting state of the corresponding branch, a timing update operation is performed in a forward direction based on the per survivor timing recovery data, and a plurality of transition metrics is calculated during forward recursions.

15. The decoder of claim 14, wherein the PSP-SDA equalizer determines branch metrics related to each state of the trellis based on a sampling phase offset of a starting state determined from the per survivor timing recovery data.

16. The decoder of claim 14, wherein the PSP-SDA equalizer uses a Bahl, Cocke, Jelinek, and Raviv (BCJR) algorithm configured to use per survivor timing recovery from per survivor processing (PSP) to perform timing update operations for forward and backward recursions based on history data obtained from survivor paths, the PSP-SDA to jointly perform timing recovery and equalization.

* * * * *

UNITED STATES PATENT AND TRADEMARK OFFICE
CERTIFICATE OF CORRECTION

PATENT NO. : 7,602,863 B2
APPLICATION NO. : 10/950312
DATED : October 13, 2009
INVENTOR(S) : Kovintavewat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,602,863 B2 | Page 1 of 1 |
| APPLICATION NO. | : 10/950312 | |
| DATED | : October 13, 2009 | |
| INVENTOR(S) | : Kovintavewat et al. | |

It is certified that error appears in the above-identified patent and that said Letters Patent is hereby corrected as shown below:

On the title page item (73), please delete "Assignee: Seagate Technology LLC, Scotts Valley, CA (US)" and insert --Assignee: Georgia Tech Research Corporation, Atlanta, GA (US)--

Signed and Sealed this
Twelfth Day of April, 2011

David J. Kappos
*Director of the United States Patent and Trademark Office*